US012393433B2

(12) United States Patent
Agarwal et al.

(10) Patent No.: US 12,393,433 B2
(45) Date of Patent: Aug. 19, 2025

(54) METHOD AND COMPUTING APPARATUS FOR OPERATING A FORM-BASED INTERFACE

(71) Applicant: Celligence International LLC, Guaynabo, PR (US)

(72) Inventors: Pavan Agarwal, Arcadia, CA (US); Gabriel Albors Sanchez, Arcadia, CA (US); Jonathan Ortiz Rivera, Arcadia, CA (US)

(73) Assignee: Celligence International LLC, Guaynabo, PR (US)

( * ) Notice: Subject to any disclaimer, the term of this patent is extended or adjusted under 35 U.S.C. 154(b) by 0 days.

(21) Appl. No.: 18/135,703

(22) Filed: Apr. 17, 2023

(65) Prior Publication Data

US 2023/0333867 A1 Oct. 19, 2023

Related U.S. Application Data

(60) Provisional application No. 63/332,205, filed on Apr. 18, 2022.

(51) Int. Cl.
*G06F 9/451* (2018.01)
*G06F 40/174* (2020.01)
*G06F 40/205* (2020.01)

(52) U.S. Cl.
CPC ............ *G06F 9/453* (2018.02); *G06F 40/174* (2020.01); *G06F 40/205* (2020.01)

(58) Field of Classification Search
CPC ....... G06F 9/453; G06F 40/205; G06F 40/174
See application file for complete search history.

(56) References Cited

U.S. PATENT DOCUMENTS

| | | | | |
|---|---|---|---|---|
| 4,969,097 A | * | 11/1990 | Levin ..................... | G06F 3/023 400/98 |
| 5,724,457 A | * | 3/1998 | Fukushima ............ | G06V 30/32 382/187 |
| 5,805,159 A | * | 9/1998 | Bertram ................ | G06F 3/0237 345/169 |
| 5,864,340 A | * | 1/1999 | Bertram ................ | G06F 40/274 715/780 |
| 5,959,629 A | * | 9/1999 | Masui ................... | G06F 3/0237 715/708 |
| 6,002,390 A | * | 12/1999 | Masui ................. | G06F 3/04886 715/810 |

(Continued)

FOREIGN PATENT DOCUMENTS

WO 2007/090161 A2 8/2007

OTHER PUBLICATIONS

Interactive Voice Response—Wikipedia.org (Year: 2020).*

(Continued)

*Primary Examiner* — Nicholas Augustine
(74) *Attorney, Agent, or Firm* — Sheppard Mullin Richter & Hampton LLP

(57) ABSTRACT

Systems and methods are provided for completing and submitting an electronic form associated with a form-based interface by providing or conversation/chat interface for interacting with an automated software assistant (AA) and/or a human assistant (HA) using natural language commands. The AA determines whether the user may benefit from input from another user and sends that user an invitation to join the conversation.

16 Claims, 39 Drawing Sheets

(56) References Cited

U.S. PATENT DOCUMENTS

| | | | | |
|---|---|---|---|---|
| 6,321,158 | B1* | 11/2001 | DeLorme | G06Q 10/047 |
| | | | | 701/426 |
| 6,337,698 | B1* | 1/2002 | Keely, Jr. | G06F 3/0483 |
| | | | | 715/779 |
| 7,171,353 | B2* | 1/2007 | Trower, II | G06F 3/0237 |
| | | | | 715/256 |
| 7,194,404 | B1* | 3/2007 | Babst | G06F 40/274 |
| | | | | 704/10 |
| 7,881,994 | B1 | 2/2011 | An et al. | |
| 8,244,618 | B1 | 8/2012 | Fashenpour et al. | |
| 8,396,582 | B2* | 3/2013 | Kaushal | G06N 5/04 |
| | | | | 700/100 |
| 8,504,379 | B1 | 8/2013 | Bansal et al. | |
| 10,034,645 | B1* | 7/2018 | Williams | G06T 3/18 |
| 10,243,743 | B1 | 3/2019 | Madisetti et al. | |
| 10,719,301 | B1* | 7/2020 | Dasgupta | G06F 8/34 |
| 11,030,485 | B2* | 6/2021 | Karam | G06V 20/00 |
| 2002/0015042 | A1 | 2/2002 | Robotham | G06F 3/1454 |
| | | | | 345/581 |
| 2002/0024506 | A1* | 2/2002 | Flack | G06F 1/163 |
| | | | | 345/169 |
| 2002/0052900 | A1* | 5/2002 | Freeman | G06F 3/0237 |
| | | | | 715/262 |
| 2002/0156864 | A1* | 10/2002 | Kniest | A61B 5/6892 |
| | | | | 709/227 |
| 2004/0239681 | A1* | 12/2004 | Robotham | G06F 3/14 |
| | | | | 345/581 |
| 2005/0012723 | A1* | 1/2005 | Pallakoff | G06F 1/1656 |
| | | | | 345/173 |
| 2005/0190893 | A1* | 9/2005 | Stephens | H04L 12/66 |
| | | | | 379/52 |
| 2005/0195221 | A1* | 9/2005 | Berger | G06F 16/9577 |
| | | | | 345/660 |
| 2005/0223308 | A1* | 10/2005 | Gunn | G06F 3/04886 |
| | | | | 707/999.1 |
| 2005/0283364 | A1* | 12/2005 | Longe | G10L 15/32 |
| | | | | 704/E15.041 |
| 2006/0020904 | A1* | 1/2006 | Aaltonen | G06F 3/0482 |
| | | | | 715/850 |
| 2006/0026521 | A1* | 2/2006 | Hotelling | G06F 3/0488 |
| | | | | 715/702 |
| 2006/0026535 | A1* | 2/2006 | Hotelling | G06F 3/0488 |
| | | | | 715/863 |
| 2006/0026536 | A1* | 2/2006 | Hotelling | G06F 3/04883 |
| | | | | 715/863 |
| 2006/0095842 | A1* | 5/2006 | Lehto | G06F 40/242 |
| | | | | 715/259 |
| 2006/0101005 | A1* | 5/2006 | Yang | G06F 16/9537 |
| 2006/0161870 | A1* | 7/2006 | Hotelling | G06F 3/0412 |
| | | | | 715/863 |
| 2006/0161871 | A1* | 7/2006 | Hotelling | G06F 3/0485 |
| | | | | 715/862 |
| 2006/0265648 | A1* | 11/2006 | Rainisto | G06F 3/0237 |
| | | | | 715/256 |
| 2006/0274051 | A1* | 12/2006 | Longe | G06F 40/232 |
| | | | | 345/173 |
| 2007/0263007 | A1* | 11/2007 | Robotham | G06F 3/1454 |
| | | | | 345/581 |
| 2008/0005001 | A1 | 1/2008 | Davis et al. | |
| 2008/0215976 | A1 | 9/2008 | Bierner et al. | |
| 2010/0042534 | A1 | 2/2010 | Moran | |
| 2011/0137702 | A1 | 6/2011 | Hodges et al. | |
| 2011/0276513 | A1 | 11/2011 | Erhart et al. | |
| 2013/0159166 | A1 | 6/2013 | Irick | |
| 2013/0283168 | A1 | 10/2013 | Brown et al. | |
| 2015/0254555 | A1 | 9/2015 | Williams, Jr. et al. | |
| 2015/0379429 | A1* | 12/2015 | Lee | G09B 5/00 |
| | | | | 706/11 |
| 2016/0004988 | A1 | 1/2016 | Kunapuli et al. | |
| 2018/0025726 | A1* | 1/2018 | Gatti de Bayser | G10L 15/22 |
| | | | | 704/257 |
| 2019/0080169 | A1* | 3/2019 | Nowak-Przygodzki | |
| | | | | G06Q 30/02 |
| 2019/0205978 | A1 | 7/2019 | Way et al. | |
| 2019/0318099 | A1* | 10/2019 | Carvalho | G06F 21/577 |
| 2019/0333142 | A1 | 10/2019 | Thomas | |
| 2020/0074986 | A1 | 3/2020 | Kwon | |
| 2020/0259911 | A1 | 8/2020 | Schneider et al. | |
| 2020/0294128 | A1* | 9/2020 | Cella | H04L 9/3239 |
| 2020/0294130 | A1 | 9/2020 | Wong | |
| 2020/0372395 | A1* | 11/2020 | Mahmud | G06F 3/01 |
| 2020/0394708 | A1 | 12/2020 | Cella | |
| 2021/0247959 | A1 | 8/2021 | Agarwal et al. | |
| 2021/0248514 | A1* | 8/2021 | Cella | G06V 20/20 |
| 2022/0114663 | A1 | 4/2022 | Tarmann et al. | |
| 2022/0129556 | A1* | 4/2022 | Chen | G06F 21/74 |
| 2022/0166919 | A1* | 5/2022 | Weissenberger | H04N 23/61 |
| 2022/0269517 | A1* | 8/2022 | Matula | G06F 40/174 |
| 2022/0366911 | A1* | 11/2022 | Carbune | G10L 15/22 |
| 2022/0391868 | A1 | 12/2022 | Jaeger et al. | |
| 2023/0061929 | A1* | 3/2023 | Carbune | H04L 63/0861 |
| 2023/0195815 | A1* | 6/2023 | Sharifi | G06F 16/9538 |
| | | | | 707/722 |

OTHER PUBLICATIONS

PCT International Search Report and the Written Opinion mailed May 2, 2023, issued in related International Application No. PCT/US2023/011445 (11 pages).

Sam Bourgi, Bacon Protocol offers industry-first 'NFT mortgages', Cointelegraph, Nov. 17, 2021, retrieved on Mar. 28, 2023 from <https://cointelegraph.com/news/bacon-protocol-offers-industry-first-nft-mortgages> entire document.

Peter Miller, "Blockchain mortgage: the future of home loans", The Mortgage Reports, Feb. 13, 2018, retrieved on Mar. 28, 2023 from <https://themortgagereports.com/34467/blockchain-mortgage-the-future-of-home-loans> entire doucment.

PCT International Search Report and the Written Opinion mailed Feb. 8, 2023, issued in related International Application No. PCT/US2022/045802 (11 pages).

PCT International Search Report and the Written Opinion mailed Jul. 11, 2023, issued in related International Application No. PCT/US2023/018876 (9 pages).

Non-Final Office Action dated Sep. 27, 2024, issued in related U.S. Appl. No. 18/228,605 (19 pages).

Klimowicz, Aleksy, and Krzysztof Spirzewski. "Concept of peer-to-peer lending and application of machine learning in credit scoring." Journal of Banking and Financial Economics 2 (16 (2021): 25-55. (Year: 2021).

PCT International Preliminary Report on Patentability mailed Aug. 8, 2024, issued in related International Application No. PCT/US2023/011445 (10 pages).

Non-Final Office Action dated Nov. 7, 2024, issued in related U.S. Appl. No. 17/960,640 (22 pages).

Folmer et al., Architecturally sensitive usability patterns, Department of Mathematics and Computing Science, University of Gronigen, Netherlands, 2003 (Year: 2003).

PCT International Preliminary Report on Patentability mailed Oct. 31, 2024, issued in related International Application No. PCT/US2023/018876 (8 pages).

Final Office Action dated May 5, 2025, issued in related U.S. Appl. No. 18/228,605 (14 pages).

Non-Final Office Action dated May 19, 2025, issued in related U.S. Appl. No. 18/100,959 (21 pages).

* cited by examiner

METHOD AND COMPUTING APPARATUS FOR OPERATING A FORM-BASED INTERFACE

RELATED APPLICATIONS

This application claims the benefit of U.S. Provisional Application No. 63/332,205 filed on Apr. 18, 2022, the contents of which are incorporated herein by reference in its entirety.

BACKGROUND

The user interface (UI) is the point of human-computer interaction and communication in a device. For example, a graphical user interface (GUI) is a type of user interface that allows users to interact with computing devices using images rather than text-based commands.

Another type of UI may include a form-based interface which is used to enter data into a program or application by offering a limited selection of choices. For example, a website gathering information from a user (e.g., for a loan application) may include a form-based interface which creates an electronic form.

An electronic form is an electronic version of a physical form, such as a paper document with blank spaces for insertion of required or requested information. An electronic form provides an input template comprising various combinations of checkboxes, radio buttons, form fields, and other elements designed to query and display data.

An electronic form may be based on a workflow for a particular process or industry and dictates the actions of the user. A workflow is a series of activities that are necessary to complete a task. Each step in a workflow has a specific step before it and a specific step after it, with the exception of the first step. Because the workflow of a form-based interface follows the sequence associated with the fields or placeholders of the form itself, the resulting user experience may be too restrictive and rigid. Methods are needed that allow users to use natural language commands when interacting with an application having a form-based interface.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 5E illustrates an example selection between two folders, according to an implementation of the disclosure.

Figures 6A, 6B, 6C:
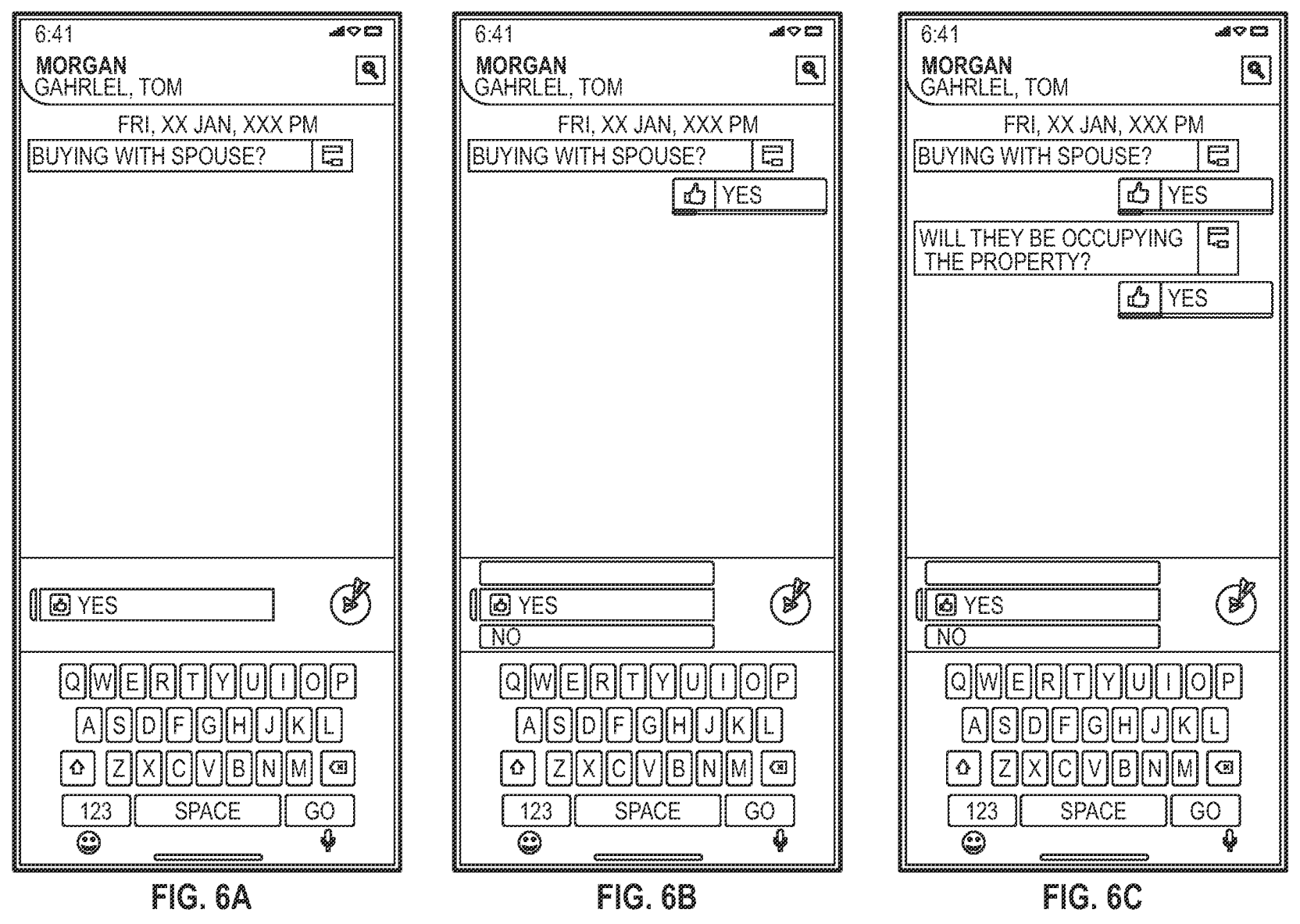

FIGS. 6A-6F illustrate example conversations between the user and both an AA and a HA, according to an implementation of the disclosure.

Figure 1:
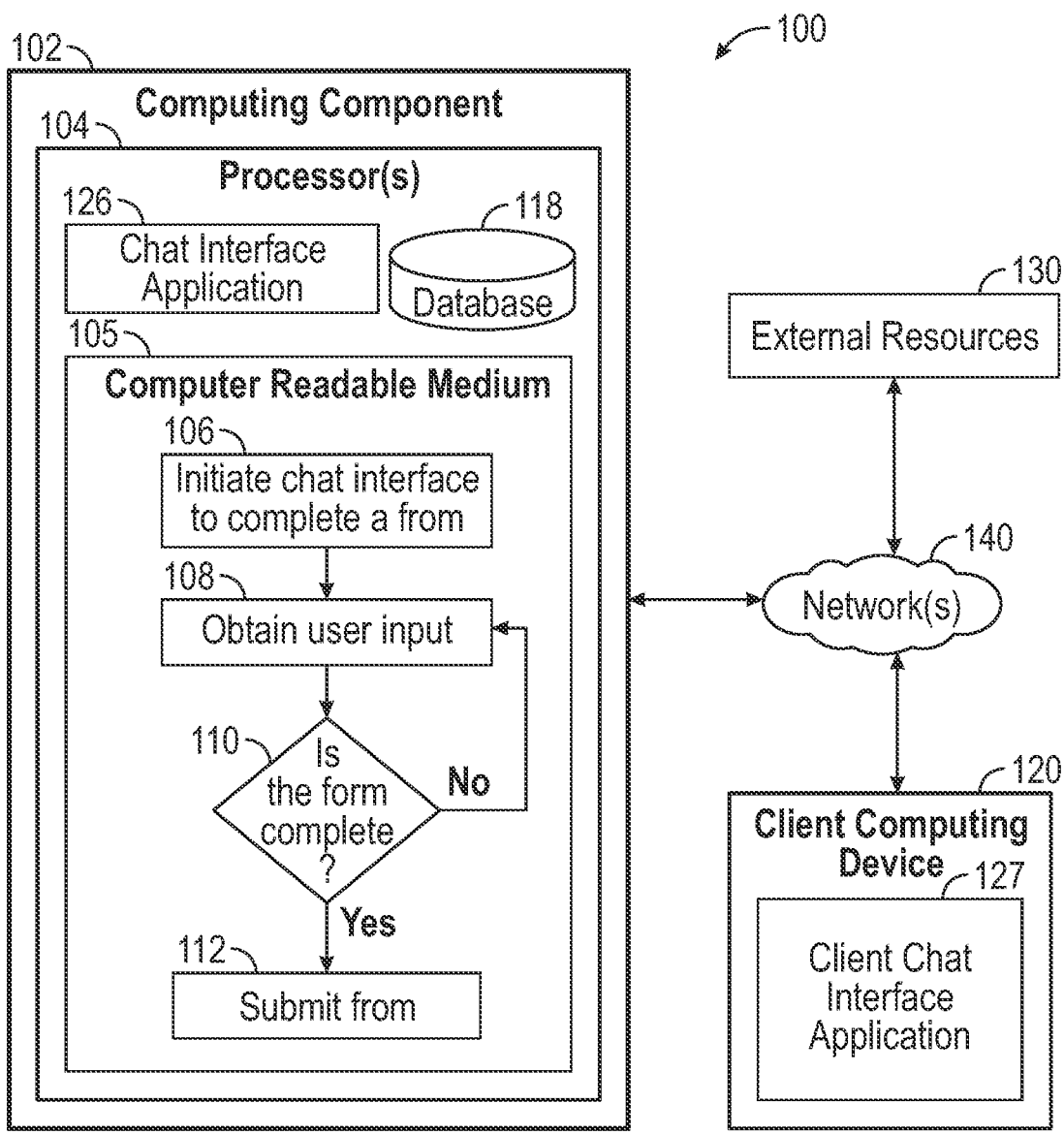
FIG. 1 illustrates an example chat interface for form-based interface system, according to an implementation of the disclosure.

Described herein are systems and methods for improving electronic form submissions by providing a natural language interface or conversation/chat interface for interacting with an automated software assistant (AA) and/or a human assistant (HA) when completing the electronic form. The details of some example embodiments of the systems and methods of the present disclosure are set forth in the description below. Other features, objects, and advantages of the disclosure will be apparent to one of skill in the art upon examination of the following description, drawings, examples and claims. It is intended that all such additional systems, methods, features, and advantages be included within this description, be within the scope of the present disclosure, and be protected by the accompanying claims.

DETAILED DESCRIPTION

Completing an electronic form when submitting a request or an order (e.g., a financial loan application) may be time consuming and require the user to have a variety of data (e.g., banking information, including account numbers, federal and state tax filings, employer information, including income information, and so on) and identification documents (driver's license, passport) available. Not all users are able to complete the form in one session. Often, users are forced to locate a variety of documents causing the form to close and restart from the beginning. For example, the user may spend twenty minutes filling out a firm only be forced to exit by failing to provide a document or information they may not have handy.

Even if the form captures previously entered data and documents, the user may have difficulty understanding the type of information they are required to provide, the scope of the form (i.e., how many more questions are left), and generally have no assistance during the process. That is because most users are unfamiliar with the requested documents and/or their possible location or purpose.

Notably, the user cannot progress to the next field of the form unless they can enter information required in the current field. Further still, information provided earlier may again be required in a later-appearing field, thus causing the user to repeatedly locate the same information. Following the workflow of the form is thus cumbersome, inefficient, and often results in the user failing to complete the form. Existing solutions fail to provide users with any meaningful assistance as they attempt to complete an electronic form (e.g., a mortgage application). In particular, even if some web sites or mobile applications offer electronic "bot" assistant feature, the bot chat assistants are only equipped with answering general, non-case-specific questions, rather than providing questions to the user-specific scenarios. The bot chat assistants fail to utilize user responses provided during the chat in facilitating completion of the form. Additionally, bot chat assistants fail to optimize the workflow in accordance with individual user needs. Finally, chatting with a bot requires the user to open a separate window.

As alluded to earlier, because the most convenient way for humans to solve problems is through a conversation, users may want to complete an electronic form provided by the form-based interface of a website through a communication tool configured to operate the electronic form. By allowing users to complete an electronic form website through natural language commands exchanged with an automated software assistant (AA) and/or a human assistant (HA) guiding the user by asking specific questions and soliciting information and documents, results in a more user-friendly interaction for the users and produces a more satisfactory user experience.

Additionally, most users prefer to exchange text messages via SMS (short message service) associated with their native messaging application rather than installing an additional component (e.g., a mobile app). However, sending confidential information via SMS messages (e.g., SSN, DOB, address, etc.) may pose security risks. By sending users an SMS message with a link via to a secure chat application running inside a standard mobile web browser allows the users to utilize their native messaging application and provide sensitive data without any potential security risks. Furthermore, the conversation inside the chat application will be reproduced for user's review as a series of text message with the exception of the sensitive data, which will be masked or obscured.

In accordance with various embodiments, a system and method for providing a natural language interface or conversation/chat interface for interacting with an automated software assistant (AA) and/or a human assistant (HA) when completing an electronic form is disclosed. For example, the electronic form may be a mortgage application soliciting input from the user in the form of questions wishing to obtain a mortgage loan. However, the presently described embodiments may be implemented in any electronic form used to obtain data.

In one embodiment, the method is configured to present the user with a chat interface configured to guide the user through the fields of the form by asking them questions corresponding to the data fields of the electronic form. In other words, rather than the user attempting to interpret what it is the form is asking them, the AA (or the HA) asks questions designed to be easily understood by the user. The input provided by the user to is then transmitted to the form interface (i.e., the underlying application). When interacting with the AA, the user will not be forced to follow the form's workflow. By contrast, the user can provide information to the chat interface associated with disparate sections or fields of the form thereby completing the form out of sequence and without regard to the standard form workflow.

As will be described in detail below, the method addresses issues related to the inefficient support the user receives when completing an electronic form. In particular, the chat interface provides user with AA configured to use a conversation (i.e., natural language questions and answers) format to elicit user reposes required to complete the form. Further, the AA is configured to "invite" HA based on user's needs, the HA's level of skill, the HA's availability, and/or other such factors. In essence, AA may act like an "intelligent concierge" or a go-between the HA and the user. The user may converse with both the AA and the HA within the chat interface. By having the ability to interact with both the AA and HA, the user will be in the "company" of two helpful guides, never left alone to complete the arduous task of filling out an online form. In some embodiments, AA may be the primary point of contact with the user. For example, the AA may only invite the HA upon determining that the user is not receiving effective support and engage HA. The AA may recognize insufficiency or lack support by analyzing the time the user has spent providing answers to a particular question (i.e., a higher number of attempts or longer time period may indicate user is having trouble), actual user responses, including their emotional context, and emotional state of the user including nonlinguistic cues (e.g., the user's facial expressions obtained from video feed).

In some embodiments, the AA may assist the HA as the HA is in turn assisting the user. For example, the system may generate workflows that the HA can select. Each workflow will initiate a sequence of automatically generated questions to the user on a particular subject or an area of the form. That is, each workflow may group related questions together. By sending a particular workflow to the user, the HA avoids asking specific questions manually. The system may also generate quick requests, which may include individual questions or requests that user must provide when completing the form. For example, age, income, property address, and so on. Each quick request element may include a unique icon. User's response to a quick request or any other question may be tagged with an icon thus making it easier for the user to recognize which response is related to which data element. Further still, the user may drag the quick request links to a particular response to categorize their response. For example, when the user provides a response out of sequence or when either AA or HA do not understand user's response, tagging the response with a quick request category allows the user to communicate the purpose of the response with greater efficiency.

In some embodiments, the user may "fill-out" a plurality of electronic forms using distinct conversations within the chat interface. In other words, the system may recognize that one conversation may be associated with an identifier, e.g., a loan number. In the event the system cannot recognize the identifier, the user may drag an icon of a previously submitted document related to that loan number to the conversation to form the association. Alternatively, the user may enter a text or voice command to make the association. Additionally, the conversation may include folders or subfolders within the conversation which may contain information related to one particular identifier. For example, a loan number may be a parent folder and a bank account may be a folder or a sub-folder. The system may identify the folder using the identifier.

In some embodiments, the AA may provide assistance to the HA by generating suggestions that HA may choose to send to the user. These suggestions may be generated using a number of techniques including machine learning. The suggestions generated by the AA may allow the HA to expedite their support efforts and increase accuracy and customer satisfaction.

Furthermore, the system may determine user's emotional state by linguistic cues (e.g., what the user says in their responses), nonlinguistic cues (e.g., the user's facial expressions obtained from video feed) and generate an emoji reflecting a particular state. The emoji may be sent to the HA as a reminder to be more mindful of user's emotional state during the chat interface. By recognizing user's emotional state, the AA may timely signal to the HA that special attention needs to be paid (e.g., change in words and general attitude of HA) resulting in an improved customer satisfaction.

In some embodiments, the AA may use machine learning algorithms trained on existing HA and user interaction data to predict how the user is likely to feel about any particular topic or line of questioning. For example, questions related to producing tax forms may always cause stress to users. By receiving the prediction of emotional state before the user actually experiences these emotions allows the system to prevent potential conflicts, provide improved customer experience, and successfully complete the task of submitting a form. That is, by sending a signal to the HA, HA may adjust the way they converse with the user to prevent potential difficulties.

Finally, the system may be configured to put the conversation on hold or pause it to prevent the AA or HA from expecting input from user and continue to request it. The system may pause the conversation by processing user input (e.g., the user informing that they don't have requisite documents, don't wish to proceed at this time, the user requesting additional information). Once the user returns and reengages, they may activate the conversation (e.g., by pressing play).

The methods and techniques described herein may give rise to various technical effects and advantages. For example, the faster can AA can obtain information from the user required to complete an electronic form, the faster the user will submit the order, thereby increasing the likelihood the user will use the chat interface and AA's assistance in the future. Similarly, by providing a more empathetic experience (i.e., attuned to user's emotional state), AA will ensure that the user is more likely to be satisfied with the process and use the application in the future. The more a user utilizes the chat interface, the more the AA may be able to learn about the user and the user's requests/interactions. Consequently, AA may be able to make more intelligent recommendations and provide more useful assistance in the future, increasing the AA's overall efficiency and conserving computing resources such as memory, power, processor cycles, and/or network bandwidth.

Moreover, tracking user's emotional state may yield more efficient dialog between the user and the AA and/or HA who receives response suggestions based on user's emotional state, thereby decreasing the consumption of computing resources. For example, AA may request HA's assistance and inform of the user's highly agitated state, without HA having to ascertain the state which potentially may cause further agitation.

AAs may output statements obtained from various sources. In some implementations, the AA may have access to a library of statements extracted from prior message exchange threads between multiple participants (assuming, of course, the prior message exchange threads were authorized for such use). In some implementations, the AA may map one or more user states (e.g., sentiments) to groups of statements from the library, e.g., using heuristics. In some embodiments, the AA may utilize a machine learning classifier that is trained based at least in part on pairs of user statements in different parts of the workflow, expressing sentiment and participant responses to those statements of sentiment extracted from the prior message exchange threads.

FIG. 1 illustrates a chat interface for form-based interface system 100, in accordance with the embodiments disclosed herein. This diagram illustrates an example system 100 that may include a computing component 102 in communication with a network 140. The system 100 may also include one or more external resources 130 and a client computing device 120 that are in communication with network 140. External resources 130 may be located in a different physical or geographical location from the computing component 102.

As illustrated in FIG. 1, computing component or device 102 may be, for example, a server computer, a controller, or any other similar computing component capable of processing data. In the example implementation of FIG. 1, computing component 102 includes a hardware processor 104 configured to execute one or more instructions residing in a machine-readable storage medium 105 comprising one or more computer program components.

Hardware processor 104 may be one or more central processing units (CPUs), semiconductor-based microprocessors, and/or other hardware devices suitable for retrieval and execution of instructions stored in computer readable medium 105. Processor 104 may fetch, decode, and execute instructions 106-112, to control processes or operations for assisting user with electronic forms. As an alternative or in addition to retrieving and executing instructions, hardware processor 104 may include one or more electronic circuits that include electronic components for performing the functionality of one or more instructions, such as a field programmable gate array (FPGA), application specific integrated circuit (ASIC), or other electronic circuits.

A computer readable storage medium, such as machine-readable storage medium 105 may be any electronic, magnetic, optical, or other physical storage device that contains or stores executable instructions. Thus, computer readable storage medium 105 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 105 may be a non-transitory storage medium, where the term "non-transitory" does not encompass transitory propagating signals. As described in detail below, machine-readable storage medium 105 may be encoded with executable instructions, for example, instructions 106-112.

As noted above, hardware processor 104 may control processes/operations for facilitating entry of user data into a form-based interface by executing instructions 106-112. Hardware processor 104 may execute instruction 106 to initiate a chat interface configured to assist user with filling out an electronic form. Hardware processor 104 may execute instruction 108 to obtain user input. The user input acquisition may begin by generating one or more workflows and quick request that AA or HA may be sent to the user. The one or more workflows and quick requests may comprise questions intended to elicit user input required to complete the form. During the user input process, the system may transmit user response to the underlying application associated with the electronic form which the user is attempting to complete. The user input acquisition may be iterative and continue until the receipt of all user input is obtained upon executing instruction 110 by hardware processor 104. Hardware processor 104 may execute instruction 112 to transmit user responses to the underlying application associated with the electronic form.

In some embodiments, client computing device 120 may be equipped with GPS location tracking and may transmit geolocation information via a wireless link and network 140. In some embodiments, computing component 102 and/or distributed chat interface application 126 may use the geolocation information to determine a geographic location associated with the user. In some embodiments, gesture interpretation server 120 may use signal transmitted by client computing device 120 to determine the geolocation of the user based on one or more of signal strength, GPS, cell tower triangulation, Wi-Fi location, or other input. In some embodiments, the geolocation associated with the user may be used by one or more computer program components associated with the chat interface application 126 during user interaction with client chat interface 127.

In some embodiments, computing component or device 102 may include one or more distributed applications implemented on client computing device 120 (e.g., chat interface application 126) as client applications (e.g., client chat interface 127). As alluded to above, distributed applications and client applications of computing component or device 102 may have access to sensor data included in client computing device 104. In some embodiments, chat interface application 126 may have a client allocation implemented within client computing device 120. For example, chat interface 127 may be implemented by a chat interface application 126. In some embodiments, the user may be interacting with the form-based application via a graphical user interface of a client chat interface 127 running on the client computing device 120.

In some embodiments, automated software assistants or bots may be provided by distributed chat application 126. For example, the automated assistant or bot may interact with users through text, e.g., via chat interface of client chat interface 127. In some embodiments, an automated assistant may be implemented by an automated assistant provider such that it is not the same as the provider of distributed chat application 126.

In some embodiments, user authentication may be integrated as a part of the conversation. Rather than obtaining user credentials upfront, as is customary with virtually all applications today, the present system provides a more "human" experience by authenticating the user after starting the conversation. Similar to how a concierge at a hotel does not first ask a guest for their identification, the present system begins with the conversation rather than authentication. By virtue of leveraging information available to the chat application 126, such as the data associated with user's computing device, or previously provided personal information, the user can avoid being asked repeated questions to verify their identity thereby increasing processing efficiency and user satisfaction, which in turn ensures repeated usage of the presently disclosed system.

In some embodiments, client chat interface 127 may utilized some of the captured user device related information and/or data from user's first request (e.g., from user's inquiry "Hi this Joe, I have a question."). If suitable permissions exist, client chat interface 127 may obtain IP address, GPS location, mobile phone, email address(es), social media account(s) used by the user to register on that device, video and or image data accessed from the mobile device (e.g., front facing camera), and/or any other information actually provided by the user. Additionally, application 126 or computing components 102 may utilize available conversation or speech patterns associated with a dishonest or "scammer" user when analyzing speech patter of a user. The conversation or speech pattern may include one or more keywords or phrases that a particular user is known to use (e.g., "hey" rather than "good afternoon").

The application 126 or computing components 102 operating the AA may utilize machine learning classifier that is trained based at least in part on known bad actor statements expressing interest in utilizing the services provided by the chat interface and statements of similar contextual value extracted from the prior message exchange threads of the present user. For example, a corpus of prior message exchange threads may be authorized for use in training an artificial intelligence scheme such as a machine learning classifier or neural network. User words, phrases, and/or statements in the message exchange threads from known bad actors and other uses may be used as user inputs. Known identity may be provided as labeled outputs. For example, messages from known scammers, may be identified as such. A machine learning classifier, a neural network, or other artificial intelligence model may be trained using these labeled pairs to identify potential bad actor user input and/or confirm identity of a known user.

In some embodiments, application 126 or computing components 102 may generate an identity matrix for each user based on the input related to the user received over time (including any analysis results by the machine learning classifier).

In some embodiments, the algorithm may determine whether additional authentication parameters are needed (e.g., username and password, authentication token sent via email or SMS, current image and use of facial recognition, secret questions previously selected by the user) based on the one or more authentication sequences. The more the user employs the chat interface 127, the more detailed the identity matrix will be. Upon determining that authentication is needed (e.g., based on the user statement "What is the approval status of my loan?" which may be associated with bad actors), the application 126 or computing components 102 operating the AA may use the identity matrix to select the most appropriate path for authentication.

In some embodiments, application 126 or computing components 102 may be configured to determine authentication sequences for individual users based on the input received over time.

In some embodiments, application 126 or computing components 102 may be configured to take the fastest path to authenticate the user. For example, the system may attempt to authenticate the user based on parameters and data described above (e.g., GPS location data, mobile device number, conversation pattern, and/or other such data) without requesting additional input such as password or token from the user. By contrast, if the authentication using available data is not possible or does not produce an authentication response above a particular threshold, or is taking too long, then the client chat interface 127 may be configured to request additional authentication data to confirm user identity.

Figure 2A:
FIG. 2A illustrates an example form-based interface, according to an implementation of the disclosure.

The user may initiate the client chat interface 127 configured to provide an interface using natural language or voice commands when entering information via a form-based interface by selecting such form-based interface. For example, as illustrated in FIG. 2A, user may select "Apply Now" option 201 to apply for a mortgage loan. This may cause the system to initiate a previously installed client chat interface 127 on user computing device 120.

Figure 2B:
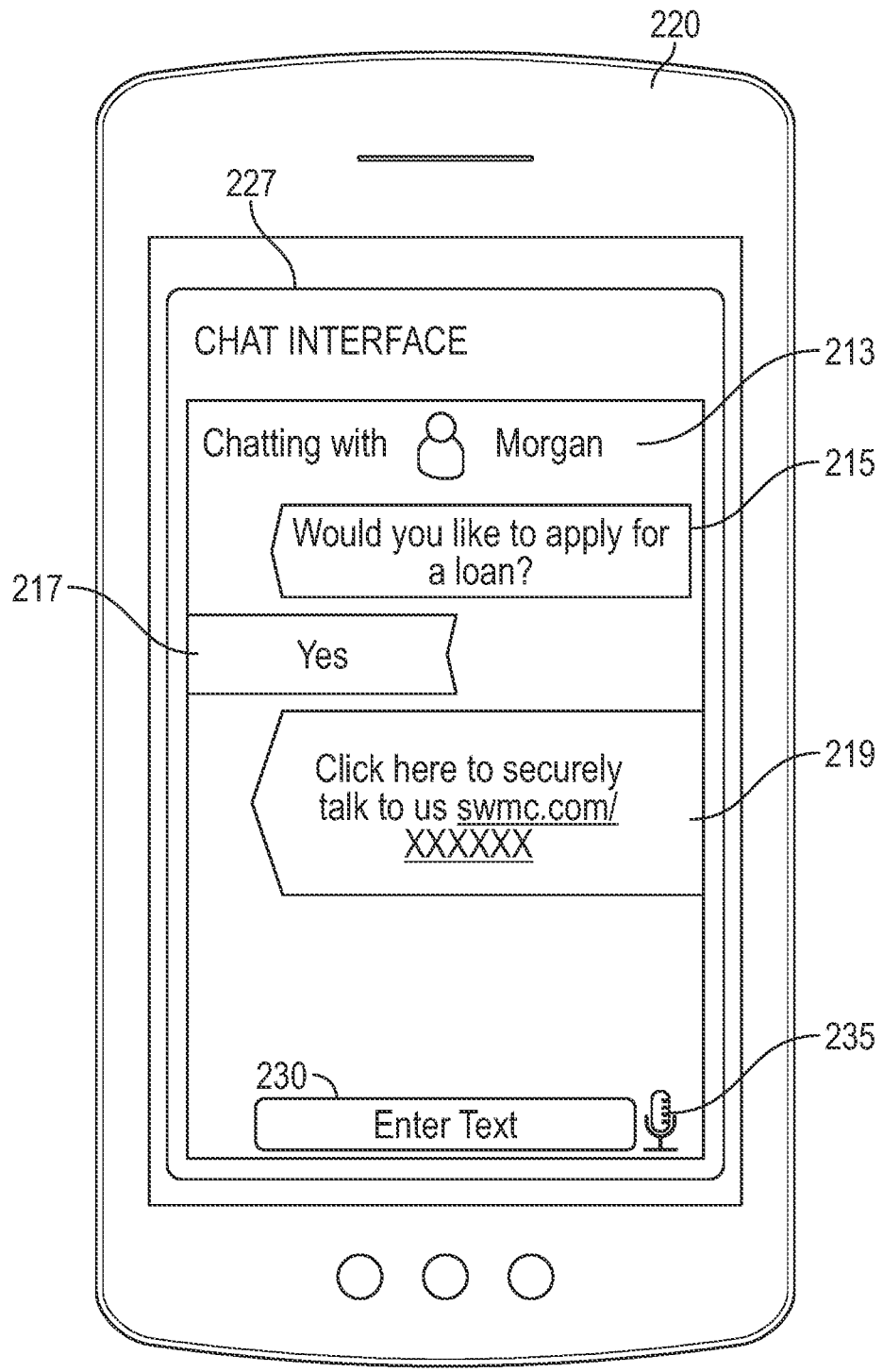
FIG. 2B illustrates an example web-based chat interface to assist with form-based interface, according to an implementation of the disclosure.

In some embodiments, the user may not have a previously installed client chat interface 127 on user computing device 120. In that case, selecting "Apply Now" causes system 100 to send an SMS message via a native messaging application. For example, as illustrated in FIG. 2B, an SMS conversation may be imitated with AA Morgan 213 via native messaging application 221 on user computing device 220. The AA Morgan 213 may be reached at a standard number for example, 333111. The user may receive an SMS message 215 "Would you like to apply for a loan?" from AA Morgan 213. In response, the user may provide a response 217 "Yes" by entering text via window 230 or by entering a voice response by pressing microphone 235. User's response 217 will also be sent as an SMS message via native messaging application 221.

In response, AA Morgan 213 may send another SMS message 219 "Click here to securely talk to us swmc.com/XXXXXX". The link provided in the message 219 will open a secure browser window providing a web-based chat interface application (e.g., client chat interface 127) which will allow the user to use exchange natural language or voice commands with an AA or HA when entering information gathered by an electronic form having a form-based interface of a web-based or mobile application, such as a mortgage loan application.

Subsequently, the user may be accessing the history of messages exchanged by accessing it in the native messaging application as it will be replicated there with the exception of any confidential information which will be obscured or masked, as discussed below. The user may re-activate the conversation and re-start form completion upon sending another message via the native messaging application.

Figure 3:
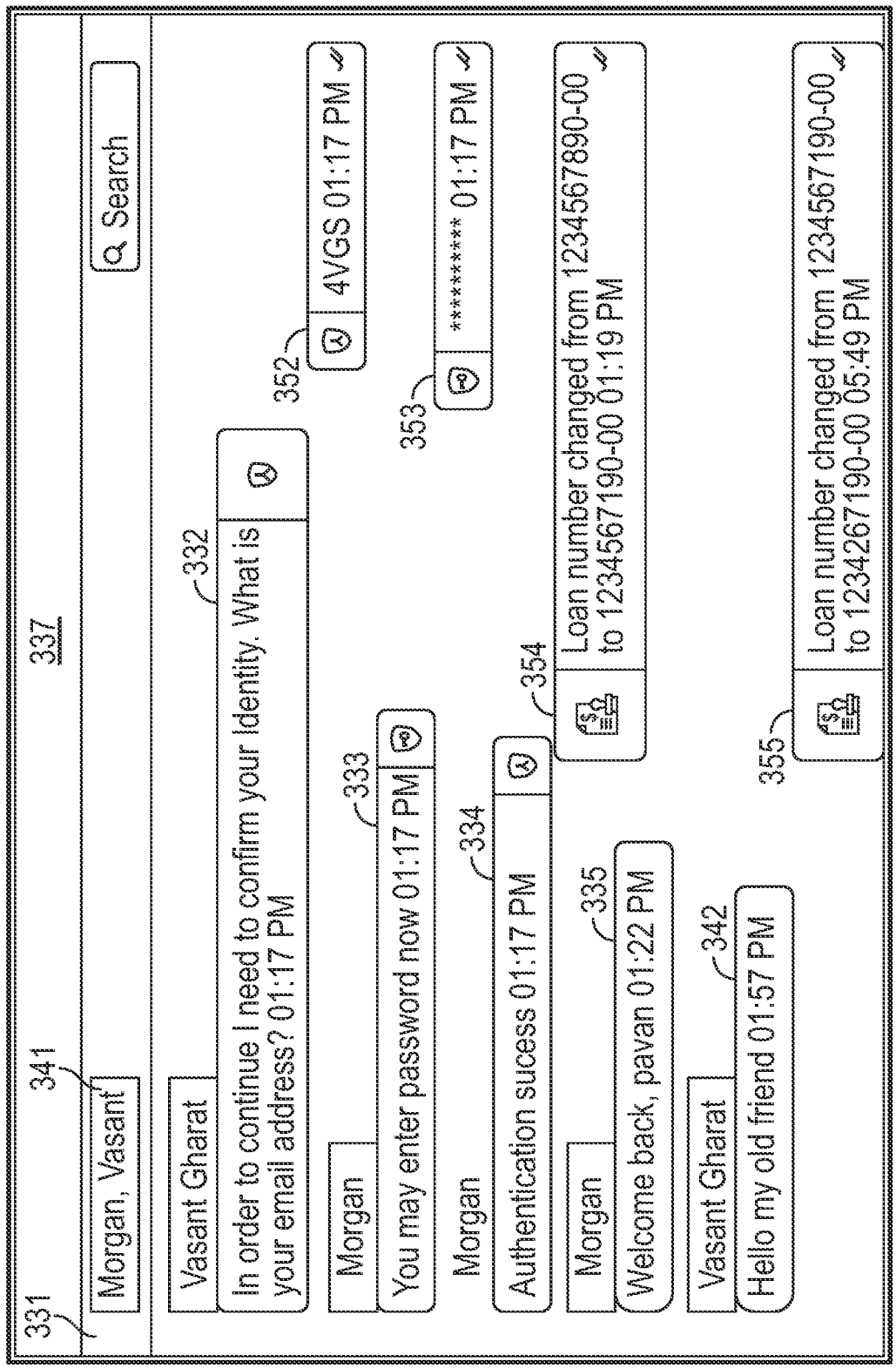
FIG. 3 illustrates an example chat interface to assist with form-based interface, according to an implementation of the disclosure.

Alternatively, if the user has previously installed the client chat interface 127 on user computing device 120, the system will initiate the client chat interface 127 to allow the user to converse with the AA or HA. For example, as illustrated in FIG. 3, user-view of the chat interface 337 allows the user to converse with AA 331 called "Morgan" and HA 341 called 'Vishant" when completing an electronic form (e.g., a mortgage loan application illustrated 2A). The user knows that Morgan is always the AA. AA Morgan 331 may ask user a series of questions 332-335 to which user may respond with responses 352-354. Similarly, HA may ask question 342 to which user may respond with response 355.

As alluded to above, if AA is handling the conversation alone, AA may determine that help is needed, and asks HA to join. Effectively, a conversation akin to a "group chat" is created whereby user is conversing with HA and AA in the same conversation. In some embodiments, AA will never be left alone with the user. If the HA abruptly disconnects the AA will start "pinging" available HAs. By ensuring that the user is never left unattended allows the system to create a more seamless and satisfactory user experience. Existing applications that utilize AA may generate a response, e.g., "I'm sorry I don't have that answer, I have forwarded your request to an operator." However, the user is left waiting and without a solution. Accordingly, the present system provides a faster response time without sacrificing quality of assistance.

In some embodiments, the AA may determine that based on user's questions, the conversation is moving into a new area of specialization. For example, the system may use a machine-learning algorithm trained on previous interactions with users applying for a mortgage loan to determine that the user is looking for assistance beyond standard data collection.

At this point, AA will automatically contact HA expert in that area. For example, if the conversation moves from underwriting to interest rates and fees, then the AA will reach out to the licensed loan originator assistant. If the AA fails to engage the right person or if the HA engages another specialist before the AA detects the system records this event which is then used as feedback during the training of the machine learning algorithm. In other embodiments, the machine learning algorithm may use the combination of contextual data and the expert HA selected by the other HA In some embodiments, the system will be configured to prevent both AA and HA from submitting a response to the same user question causing further confusion. For example, AA may suggest to HA what to type, if the HA accepts the AI's suggestion as is, then it will send that message to the user with the label of "Morgan" so that the user knows it's the AA talking to the user. If the AA sends a message, it will block the HA from sending a message for a predetermined time period (usually a few seconds). The HA can, however, click on the message that the AA sent and revise it. The user will see a strike out through the part of the original message text (from the AA) followed by the HA text. For example, AA's message may include text: "I didn't understand that response." However, HA who understood the response can click on the message in the sent log and correct it. The corrected message will show both the original text and the correction (as a strike-through).

The HA may be selected based on the context of the conversation the HA with the matching skill set will be selected and priority will be given to the HA the requisite skill set that most recently assisted this customer. In addition, as the AA "learns" about the customers personality and emotional state, the AA will select the most appropriate HA. For example, if the context of the conversation is loan underwriting, then the underwriter that most recently assisted this customer will be invited. However, if the customer is using language that has a negative sentiment (i.e., expressing frustration, dissatisfaction, etc.) then the underwriting manager will be looped in.

Figure 4A:
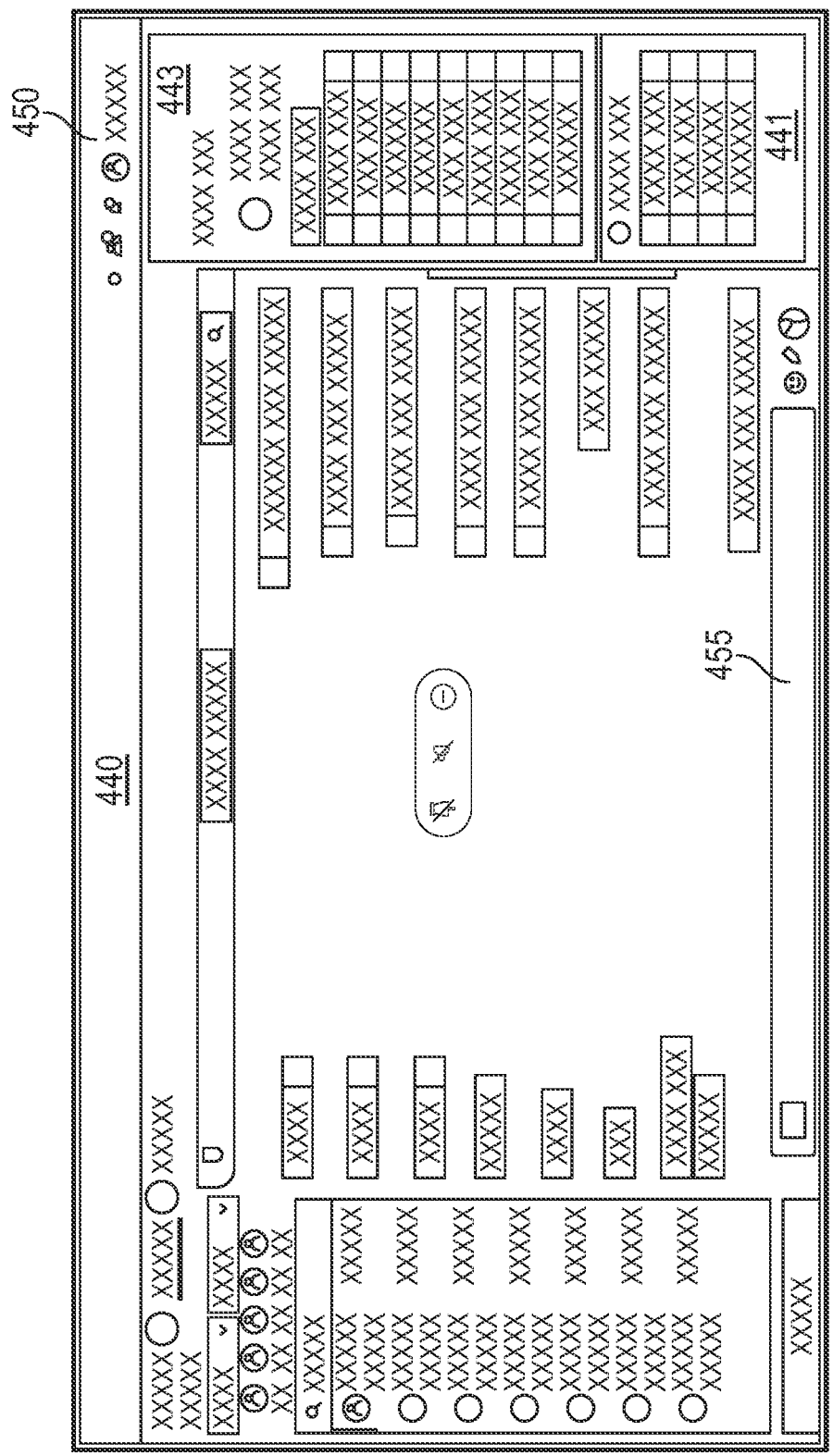
FIG. 4A illustrates an example chat interface comprising generated workflows and quick suggestions, according to an implementation of the disclosure.

In some embodiments, the system may be configured to provide a HA-only view of the client chat interface 127 used by HAs when assisting (i.e., conversing with) users who are entering information in an electronic form. For example, as illustrated in FIG. 4A, the HA-only view of the chat interface 440 may be used by HA 450 when assisting the user.

In some embodiments, HA-only view 440 will include a set of workflows generated by computer component 102 and/or chat interface application 126 (illustrated in FIG. 1) to provide HA more efficient collection information form the user. In particular, by selecting a particular workflow, HA automatically engages AA's help to gather responses to questions in a particular category or phase of the process (e.g., mortgage loan application process). For example, the client chat interface 127 may generate workflows corresponding to a group of questions within an electronic form the user is attempting to complete. As illustrated in FIG. 4A, HA view 440 of the chat interface application 126 may include workflows 441 (also illustrated in FIG. 4B) and quick requests 443 (also illustrated in FIG. 4C). Each workflow 441, e.g., "Apply Now", "Getting Started", "Customize Quote," and "Authenticate", may include questions to be provided by the user which are grouped based on a particular process. For example, the questions from "Getting Started" may include all questions related to the user (e.g., name, dob, address,) that can also be relevant to "Apply Now" workflow.

Figure 4B:
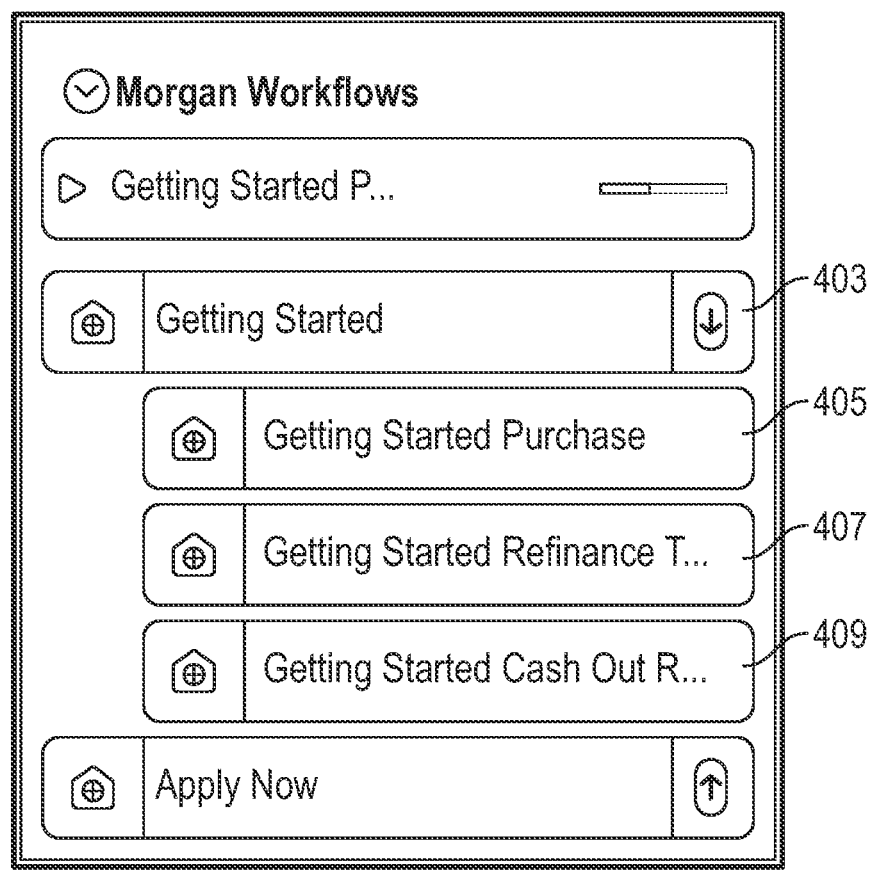
FIG. 4B illustrates example workflows generated by AA, according to an implementation of the disclosure.
Figure 4C:
FIG. 4C illustrates example quick requests generated by AA, according to an implementation of the disclosure.

In some embodiments, one or more workflows 441 may include a set of sub-workflows based on particular needs of the user. For example, as illustrated in FIG. 4B, the Getting Started workflow 403 may include a sub-workflow 405, 407, 409, that will be selected by the HA based on the needs of the user. For instance, the HA will select sub-workflow 407 if the user is applying for a refinance loan.

Individual workflows are optimized for individual users based on a determination of user satisfaction for existing or standard electronic form completion workflows. As alluded to above, workflows comprise questions configured to elicit user responses to complete a particular category or phase of the process. Prior to the beginning completing a form and following each response of each user, the application 126 and/or component 104 (illustrated in FIG. 1) calculates a user satisfaction index which represents the overall satisfaction for each user completing the form. The user satisfaction index may be the result of a mathematical function that includes the results of machine learning applied to data associating subject-related factors and self-reported or imputed levels of satisfaction, and may also combine domain expertise in the form of explicit knowledge or rules.

User satisfaction encompasses different known factors that may be used to calculate a user satisfaction index. One such factor is the user's investment of time. Often, users completing electronic forms are required to make significant time investments to gather all the requisite information (e.g., personal information, income and tax information, investment information, property information, and so on). Another factor includes convenience. For example, requesting hard to obtain documents or third-party's participation is burdensome and increases the time the user spends completing the form. Additionally, users who are completing multiple forms simultaneously, as will be discussed below, will complete both forms faster if the number of repeat questions is kept to a minimum.

User satisfaction is also a function of the type of form that is being completed based on its content including the loan type and loan amount, and specifically the type of information the user must provide (e.g., homeowner status, income, and marital status, and other such similar information). Different applications (e.g., pre-approval, new buyer, refinance) have varying number of questions of varying the user is required to provide that affect user satisfaction.

User satisfaction is also a function of the chat interface guidance provided by AA or HA. User satisfaction can be increased by: (1) eliminating repeat questions, (2) having empathetic and supportive AA or HA, (3) providing user friendly instruction on how to submit and subsequently access documents, (4) the opportunity to adaptively modify answers, and (5) keeping the user informed of the progress and time necessary to complete the form.

In various embodiments, calculating the user satisfaction index is accomplished using machine learning methods based on the available data for some or all of time investment, personal situation for time dependency, access to documents, complexity of the form, number of forms being completed simultaneously, and/or other factors. These data are examples of independent factors (independent variables). Historical data regarding the association of these factors with actual completion and submission of the forms, or data regarding user satisfaction, or other measures of realized user satisfaction, are examples of dependent factors (dependent variables).

In various embodiments, those factors thought to be associated with user satisfaction are delineated. Each factor is assigned point values that are presumed to be associated with a perceived increase or decrease in user satisfaction. For example, the time it takes to complete a form is known to be associated with user satisfaction. One possible point assignment is 0 points for completion time less than 30 minutes, 1 point for completion times between 30 and 60 minutes, and 2 points for completion times greater than 90 minutes. Across all assumed factors, points are assigned, and then summed to determine an overall point score. Mathematical optimization algorithms, such as an evolutionary algorithm, can then be used to optimize the point assignments so as to best match the actual reported perceived level of satisfaction.

In the case of a neural network approach, the specific architecture and neuronal transfer functions may be attained by a process of trial and error, or as a result of stochastic optimization using an evolutionary algorithm, or other method. For example, an evolutionary algorithm may start with a collection of alternative weights, transfer functions, and architectures for a neural network. Based on the effectiveness of assessing available inputs to generate desired outputs, a subset of the weights, transfer functions, and architectures that provide the greatest overall success are retained and then varied to create new weights, transfer functions, and architectures that are related to those that were most successful. These new designs are then tested, and the process is iterated, eventually converging on a design that is deemed optimal for the expended computational effort.

A neural network may be optimized with respect to an objective function that describes the worth of predicting outcomes accurately or with some degree of error, forecasting either too high or too low, with potentially uneven penalties for these two types of error. For example, in the case of employing a neural network for measuring user satisfaction, the costs of predicting too high versus too low are unlikely to be symmetric. Predicting too low means that the actual satisfaction the user is experiencing is higher than estimated. This may result in more actions and cost to increases a user's satisfaction than would be necessary. Predicting too high means that the actual satisfaction the user is experiencing is lower than estimated. This may result in the user feeling stressed, frustrated, and may lead to the user abandoning the completion of the form. It is important to use appropriate judgment when creating the objective function to that costs of these different types of errors are incorporated in the function. Data and model sufficiency may be assessed in part based on the performance of the designed neural network on test data held out from the training data.

Machine learning creates a useful mapping from the independent factors to the dependent factors, such that the mapping can be reused in future situations to predict the level of user satisfaction given a set of independent factors. As noted above, one such approach is to use neural networks or other hierarchical mathematical filters, which perform successive operations starting with the independent data and seek to match given dependent data.

For the case of creating a user satisfaction index, the disclosed technology includes the following important advantages. One advantage is that input data can be described using various descriptors simultaneously. For example, the time investment to a user can be described by the actual time or the time relative to others in the same or similar circumstances. Moreover, these descriptions can be provided in numeric descriptions, such as 120 minutes, or in linguistic description such as "very high" using fuzzy logic, which is then defuzzified using conventional methods to crisp numbers for the neural network to process. Another advantage is that the machine learning method can search across these descriptors for those that are most apt to be useful for modeling.

Another advantage is that the output data, which represents user satisfaction, can be adjusted to represent an absolute level of satisfaction, or a value that is associated with a particular outcome, such as the probability of retention to completion, the probability of offering positive comments about the interface, the probability of offering positive comments about the interaction with AA or HA, or any other dependent variable.

The use of neural networks is not specific to this application. Other mathematical constructions could also be employed, including symbolic expressions, various forms of linear and nonlinear regression, fuzzy logic, and decision trees, not to exclude other possible mathematical forms. Similar applications of the invention can be employed on these other mathematical constructs.

In some embodiments, the chat interface application 126 (illustrated in FIG. 1) may generate a dynamic set of potentially useful questions (known as "quick requests") HA may ask to elicit information from the user. As illustrated in FIG. 4A, HA view 440 of the client chat interface 127 may include quick requests 443 (also illustrated in FIG. 4C). The quick requests will dynamically change based on the user-provided response to the previous question(s) within a workflow or another quick request. For example, AA may ask the user "Do you rent or own our current house?" as part of the "Getting Started" workflow 441. The user can respond to this question in three different ways (e.g., rent, own, neither). Each potential response will correspond to a unique set of questions the system may generate known as "quick requests" 443. A first set of quick request questions 443 will be generated in response to user's answer "I Rent." The quick request questions 443 will include subsequent questions such as "How much rent do you currently pay? How long have you been living at this address? Have you ever been late on your rent?" and so on. The second set of quick request questions 443 will be generated in response to user's answer "Own." It will include subsequent questions such as "How long have you owned it? Do you have a mortgage? Who is the lender? What is your mortgage payment?" and so on. The third set of quick request questions 443 will be generated in response to user's answer "Neither, I live with family." It will include subsequent questions such as "So you don't pay any rent? How long have you lived at this address?" and so on. By selecting the question from the "quick request" list allows the HA to navigate the electronic form more efficiently and obtain user responses at a faster pace. Alternative, as illustrated in FIG. quick requests 453 may include questions eliciting user response to simpler inquires (e.g., loan number, SSN, or phone number).

In some embodiments, the user may modify the earlier provided response (e.g., from "owned" to "rent"). While modifying the response immediately after providing it is not an issue, the client chat interface 127 is also configured to accommodate user modifications after having provided subsequent responses to questions generated based on their original answer they now wish to modify. Unlike the interaction via a GUI, which allows users to quickly modify a previously entered response (e.g., by clicking a particular field in a form), the modification of user provided input via a conversation interface may not be as straightforward. In essence, in an effort to change a response buried in a multi-message exchange, the user would have to scroll to find a relevant response and then modify it. As a result, the AA would generate a "new" set of downstream answers or commands corresponding with the updated user input (e.g., as a separate branch). These downstream answers in a new branch may be generated by reusing the information provided by the user in the original branch.

To further complicate the issue associated with updated user input, is the fact that a modification may trigger a divergent workflow thereby causing the AA to ask downstream questions that were not previously required by the workflow. The present embodiments provide a solution by associating the information extracted from the original branch of the conversation with a particular transaction identifier (e.g., a loan application number). Each time a new branch is generated, including a modified user response and new AA questions, that branch is associated with a previous branch by utilizing the same identifier. For example, the information extracted from each branch may be stored as a single "conversation log" in a database utilizing the online transactional processing or OLTP processing. By virtue of associating the branches with a common transaction identifier, the present embodiments can sequester individual branch data which allows the system to maintain interdependencies between user responses in separate branches.

This allows the system to generate graphical visualizations of each branch resulting in practically infinite branching capabilities.

In other embodiments, the HA can send the questions to the user according to the order suggested by the system (e.g., sequentially and corresponding to the order of the physical form). Otherwise, the HA can determine its own order and/or ask for something that is not on the list.

The machine learning algorithm will be continuously learning from every step the HA takes and future suggestions will be refined. The AA will also calculate the percentage complete so that the electronic form operator and the user know how much more they need to do to complete the workflow. The percentage complete is dynamic because the workflow is changing with every answer.

The application 126 or computing components 102 operating the AA may utilize machine learning classifier that is trained based at least in part on workflow patterns in utilizing the services provided by the chat interface and statements of similar contextual value extracted from the prior message exchange threads of the present user. For example, a corpus of prior message exchange threads may be authorized for use in training an artificial intelligence scheme such as a machine learning classifier or neural network. User words, phrases, and/or statements in the message exchange threads from known bad actors and other uses may be used as user inputs. Known identity may be provided as labeled outputs. For example, messages from known scammers, may be identified as such. A machine learning classifier, a neural network, or other artificial intelligence model may be trained using these labeled pairs to identify potential bad actor user input and/or confirm identity of a known user.

Figure 4D:
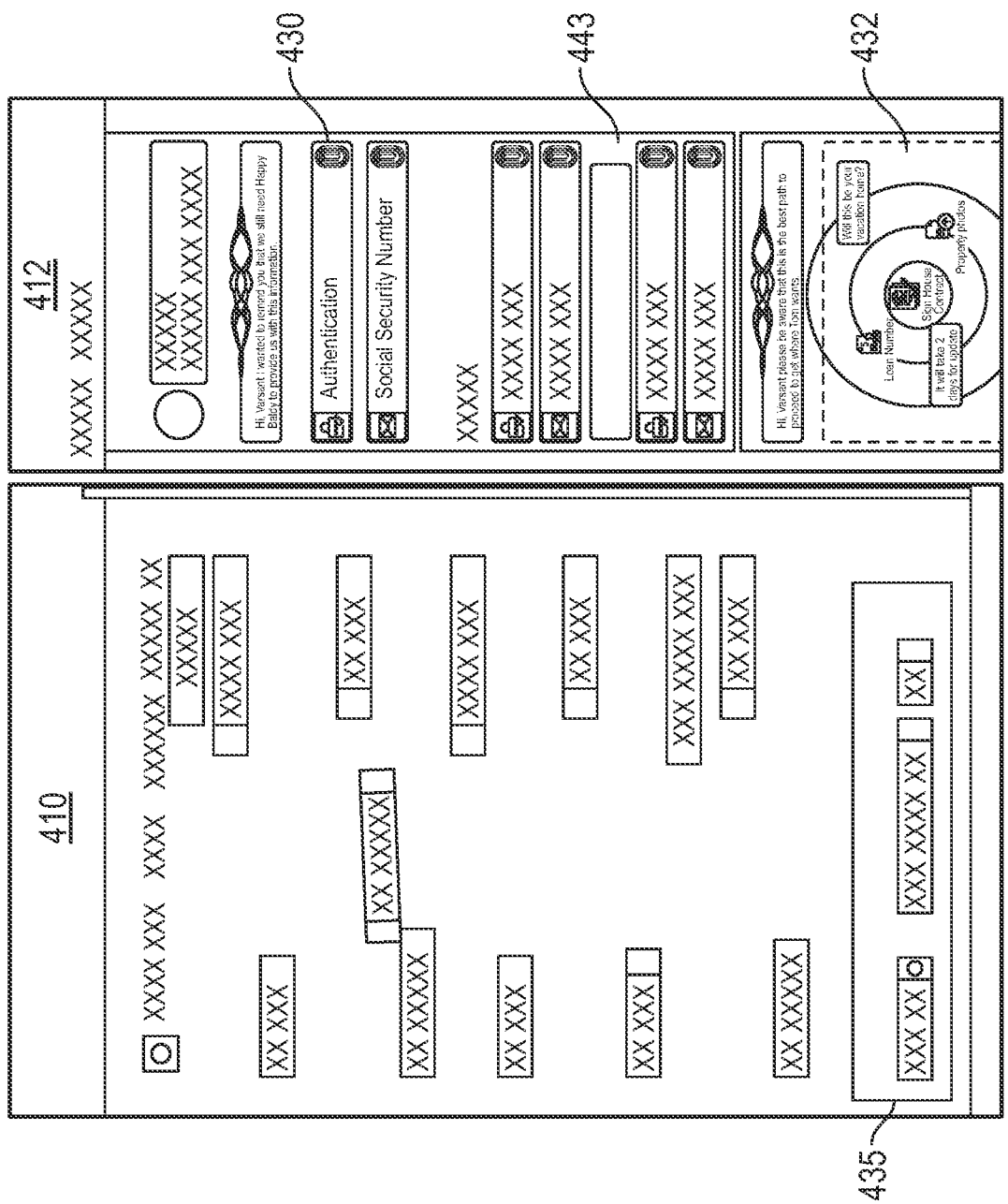
FIG. 4D illustrates example interface for HA-only use, according to an implementation of the disclosure.

In some embodiments, in addition to assisting the user using the client chat interface 127 to complete and submit an electronic form, the AA may also assist the HA who is providing expert assistance to the user (i.e., when AA is unable to assist the user, as alluded to earlier). For example, as illustrated in FIG. 4D, the HA-only view of the client chat interface 127 may include the chat interface (HA-only view) 410 as well as an additional window 412, where the AA may communicate directly with the HA (e.g., informing the HA what documents are still needed from the user) and guiding HA in their interaction with the user. The communications between HA and AA will not be visible to the user. While the HA is engaged in a conversation with the user, the AA will not send any messages to the user without the approval of the HA. As described earlier, quick requests 443 generated by the client chat interface 127 for the HA will be displayed in window 412.

Figure 4E:
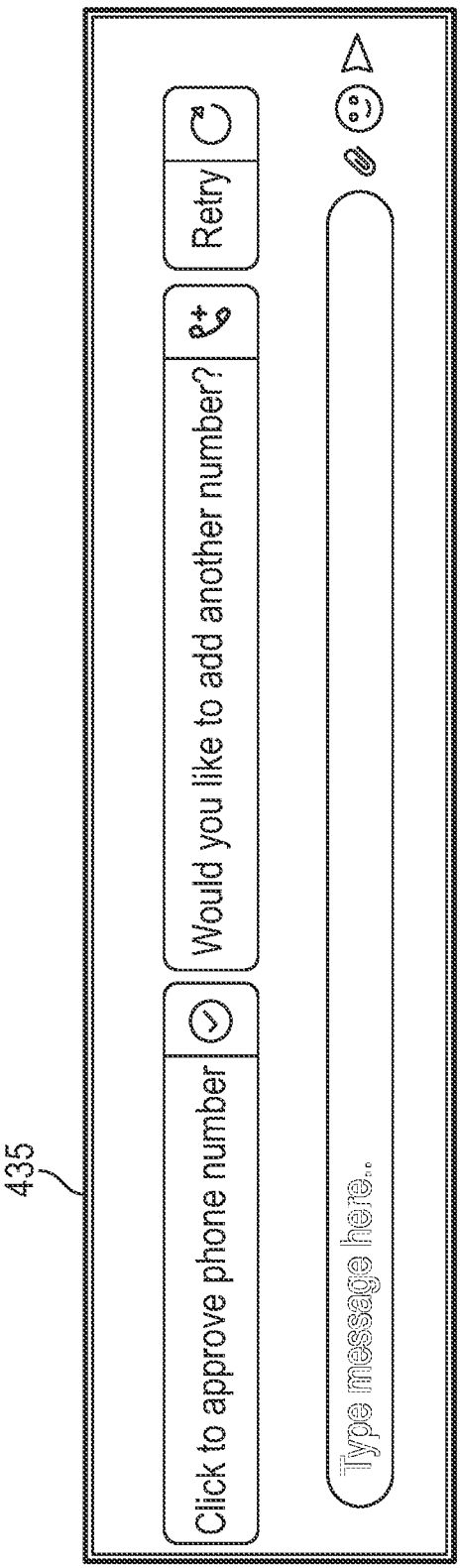
FIG. 4E illustrates example response suggestions generated by AA, according to an implementation of the disclosure.
Figure 4F:
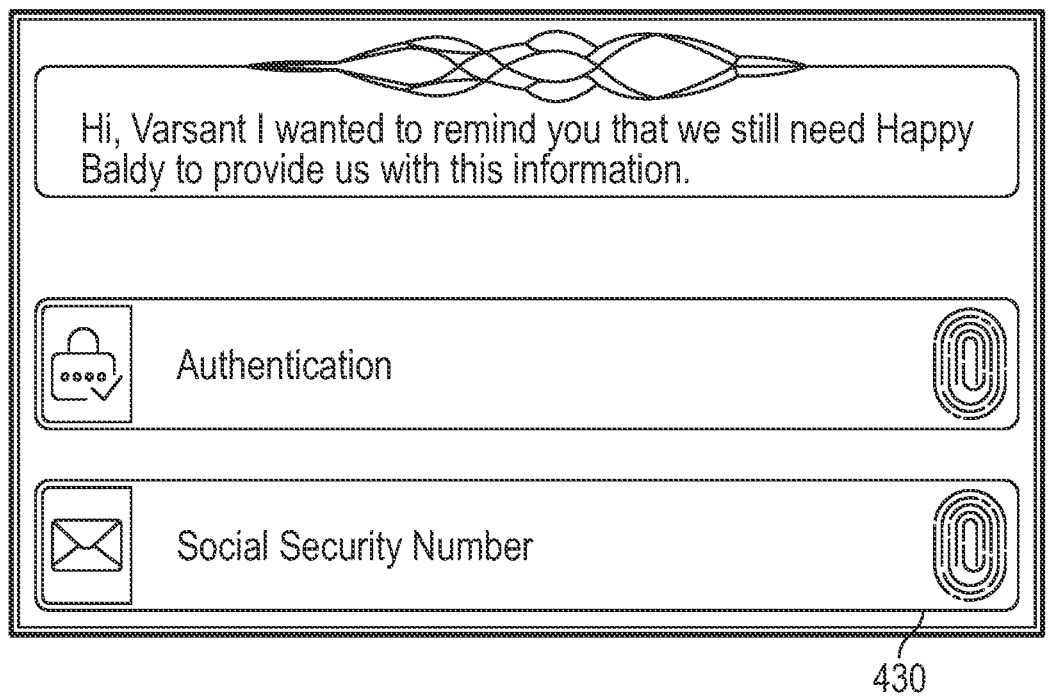
FIGS. 4F-4G illustrate example suggestions generated by AA for HA, according to an implementation of the disclosure.

In some embodiments, any request that AA has determined to require the HA's attention will be displayed in area 430 of window 412. For example, after the HA sends the user a quick request (e.g., from a list of quick requests 443), the AA may determine that certain information and/or documents are missing (e.g., user authentication credentials or loan amount) and were not requested via one of the quick requests 443. For example, illustrated in FIG. 4F, the AA may generate and display reminders in area 430 informing HA that the user still needs to submit authentication credentials by highlighting the corresponding icon which is ready to be clicked by the HA to be sent to directly the user requesting additional details.

Figure 4G:
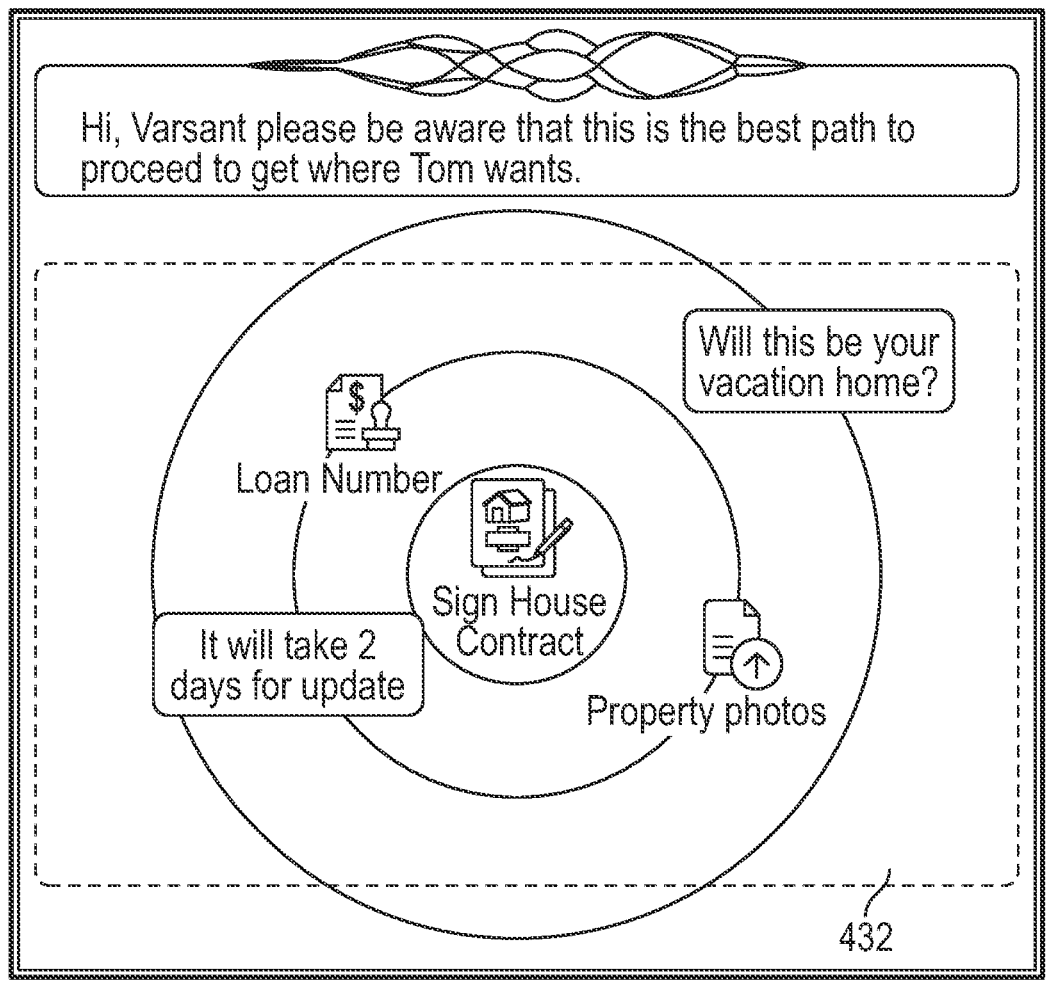

In some embodiments, the AA may determine what step or question within the workflow the HA should ask the user next based on the messages already exchanged between HA and AA and based on the current path within the workflow the HA is taking when eliciting user responses in completing an electronic form. By determining the optimized workflow pathway, the AA is able to provide users with a more efficient and satisfactory experience. In some embodiments, AA may be configured to determine alternative workflow pathways on a continuous basis. For example, the AA may present suggestions of alternative pathways based on user input received in area 432 (as illustrated in FIG. 4G). Additionally, the AA may present to the HA the best step to take, as well as the most likely step(s) to take thereafter (i.e., several steps ahead), within the area 432.

In some embodiments, the AA may provide action shortcuts to the user based on the response provided either by the HA or AA. As illustrated in FIG. 4D (also illustrated in FIG. 4E), action shortcuts 435 may be dynamically generated for a particular type of HA or AA response. For example, to avoid requesting redundant details, the HA or AA may send user a phone number. The action shortcuts may include suggested responses the user may take, e.g., "Approve," "Add Another", or "Retry". The action shortcuts or suggestions 435 may be conveniently placed above the text input field 445 of window 410. Note, the user using the client chat application will only be able to view window 410 since window 412 is for HA use only, as alluded to above.

In some embodiments, the AA may be configured to provide the user with a way to generate a default response to a question received from the AA or HA. For example, by entering one or more haptic command (a particular gesture of swiping right or swiping left) on the chat text input field (text input field 445 illustrated in FIG. 4D). By swiping right across the text input field, the AA may generate a default response based on the data that has been collected about the user (e.g., previous responses, profile information, and so on) and the question asked for user's view. For example, a default response to a question "What is your address" could be "I live at 123 main street" or "I don't know". Alternative default response may include "Yes" or "No" when relevant. The user may accept the default response and use it in the conversation.

In other embodiments, a one or more haptic commands or a particular gesture may be used by the user to modify a previously entered response. For example, the gesture of swiping left across the input box (or performing any other particular gesture) will cause the AA to interpret that as the user wanting to change their last input. In response, the AA may display the last message entered by the user in the input box and allow the user to edit it.

A conventional form-based interface severely limits the completion of individual electronic forms by the user done simultaneously or near simultaneously. In particular, when a user wishes to complete different electronic forms for different products (e.g., a mortgage application and a car loan), they are required to open individual browser windows (either web-based or mobile) and work on completing those respective electronic forms by moving from one form to another. The present embodiments allow the user to complete multiple electronic forms simultaneously using the same client chat interface 127. The AA and/or the HA may be configured to assist the user, as described above with respect to a single form, by generating workflows configured to elicit user information required in multiple electronic forms. By virtue of providing workflows for completing multiple forms, the AA increase overall efficiency, thereby ensuring user satisfaction by optimizing the sequence of inquiries, limiting the number of repeat questions, whilst conserving computing resources such as memory, power, processor cycles, and/or network bandwidth.

Figure 5C:
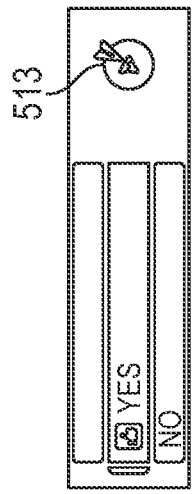
FIGS. 5C-5D illustrate example multi-question selection process, according to an implementation of the disclosure.
Figure 5D:
Figure 5B:
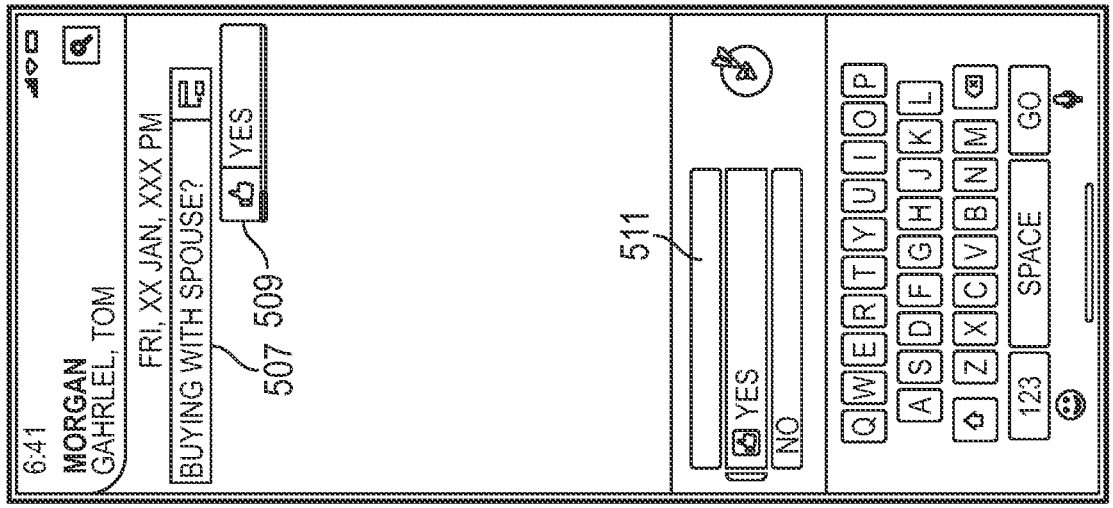
FIGS. 5A-5B illustrate example conversation between the user and both AA and HA, according to an implementation of the disclosure.
Figure 5A:
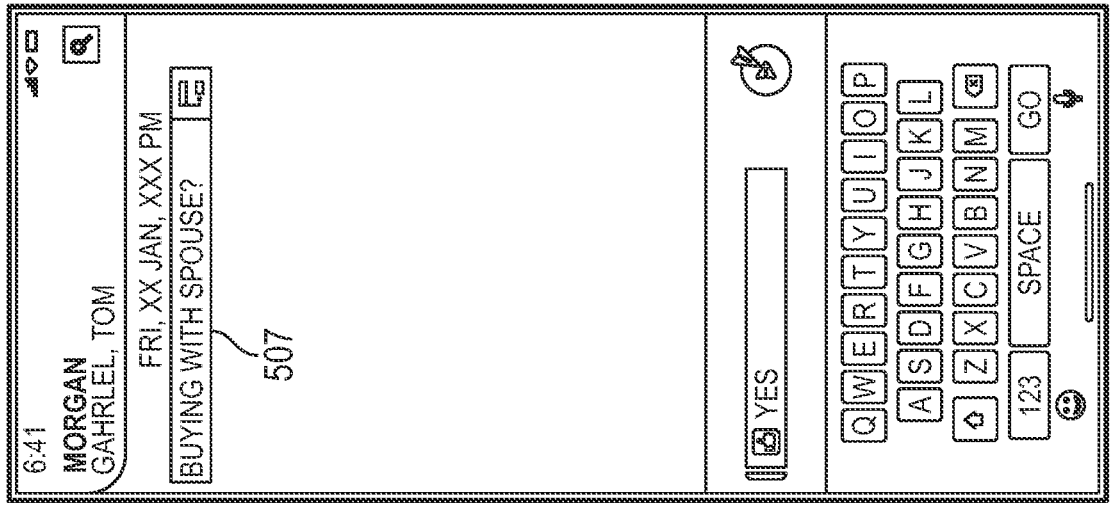

In one embodiment, the user may initiate the completion of another electronic form by submitting a command to AA. For example, the user may state that they seek to complete a pre-application process for a new quote for the house they were already working on completing with AA. In response, AA will generate a new set of questions related to a second pre-approval as a quick request, described above and illustrated in FIGS. 4A and 4D, which the HA will use to initiate the multi-form process. The initiation will result in the client chat interface 127 (illustrated in FIG. 1) generating a multi-selection interface to be displayed within the client chat interface 127 on the user side. For example, as illustrated in FIGS. 5A-B, when the HA sends the quick request for the second pre-approval, a questions "Buying with Spouse" is sent to the user. In response, a set of predetermined answers within a selection interface 511 (in this case a selection wheel) is displayed. To answer the question with one of the provided answers and to be able to see available answers for that question, the user will be able to turn the wheel on the left side to go up or down and see what works for them. When the user moves the selection interface 511, the keypad will expand showing the perspective of other options to choose from to permitting the user to scroll through to select from, for example, as illustrated in FIG. 5B.

In some embodiments, a progress indicator informing the user of the completion of the form is generated. For example, as illustrated in FIG. 5C, a send button 513 may show the progress by continuously filling the send button 513. As the user completes some of the questions of electronic form, the send button will be filled according to the number of questions the user has completed.

In some embodiments, an icon associated with a response bubble on the user side of the client chat interface 127 (illustrated in FIG. 1) will also change. For example, as illustrated in FIGS. 5B and 5D, an icon 509 associated with user's response "Yes" will show a progress bar that is filled according to the number of questions the user has completed. By virtue of incorporating a progress bar into the response bubble to show the progress, the user can see their progress even if the user exits the chat and comes back later. This will keep user informed as to what percentage they left off and also to show when any of the multistep processes have been completed one hundred percent.

Figure 5E:
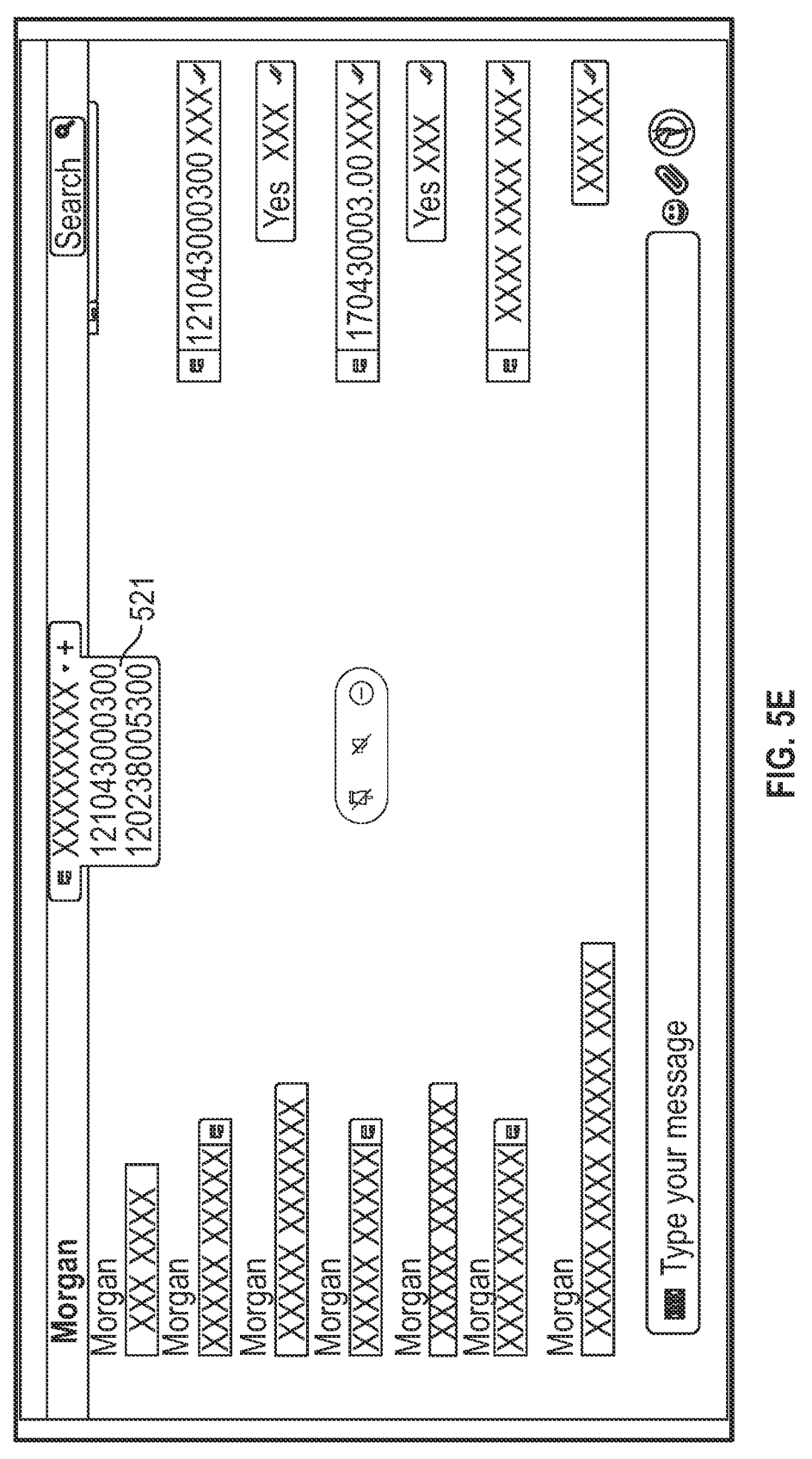

As alluded to above, as part of the multi-question process, the user may complete a plurality of electronic forms using distinct conversations within the client chat interface 127. In some embodiments, the computing component 102 and/or distributed chat interface application 126 (illustrated in FIG. 1) may associate individual form the user is completing with a unique identifier. For example, a unique identifier may be a loan number. In the event the system fails to associate the form with a unique identifier, the user may drag an icon of a previously submitted document related to that loan number to the conversation to form the association. Alternatively, the user may enter a text or voice command to make the association. Additionally, the conversation may include folders or sub-folders within the chat interface which may contain information related to a particular identifier. For example, a loan number may be a parent folder and a bank account may be a folder or a sub-folder. The system may identify the folder using the unique identifier. As illustrated in FIG. 5E, the user may use a toggle 521 to toggle back and forth between two different accounts.

An advantage of associating the forms with unique identifiers results in users having the ability to continue whatever they form they wish, or to stop and resume at a later time. Also, this change in the keypad will still allow the user to type in the answer if they wish to enter something besides the options given by the system. When the user starts typing an answer the keypad will then change back to show a regular text box, but will keep the icon on the left to show that it is still attached to the multi-step topic.

Figure 5F:
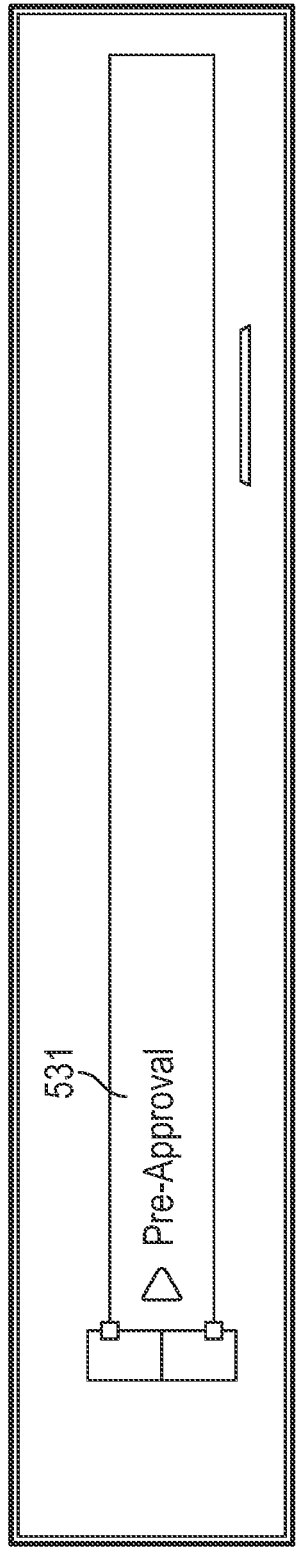
FIGS. 5F-5G illustrate example pause and play function, according to an implementation of the disclosure.

In some embodiments, the client chat interface 127 may be configured to provide users with an ability to stop and resume their response when completing a form. For example, when a user has a question or does not have the information to answer the question at this time, they can communicate that in the chat interface (e.g., stating "I don't have that information" or "Where can I find that information?"). Such response will allow AA to recognize the help needed and pause the process. Note, when the process is paused, the icon to the question topic will not appear anymore next to the chat bubble and it will show as a regular chat bubble, as illustrated in FIG. 5F.

Figure 5G:
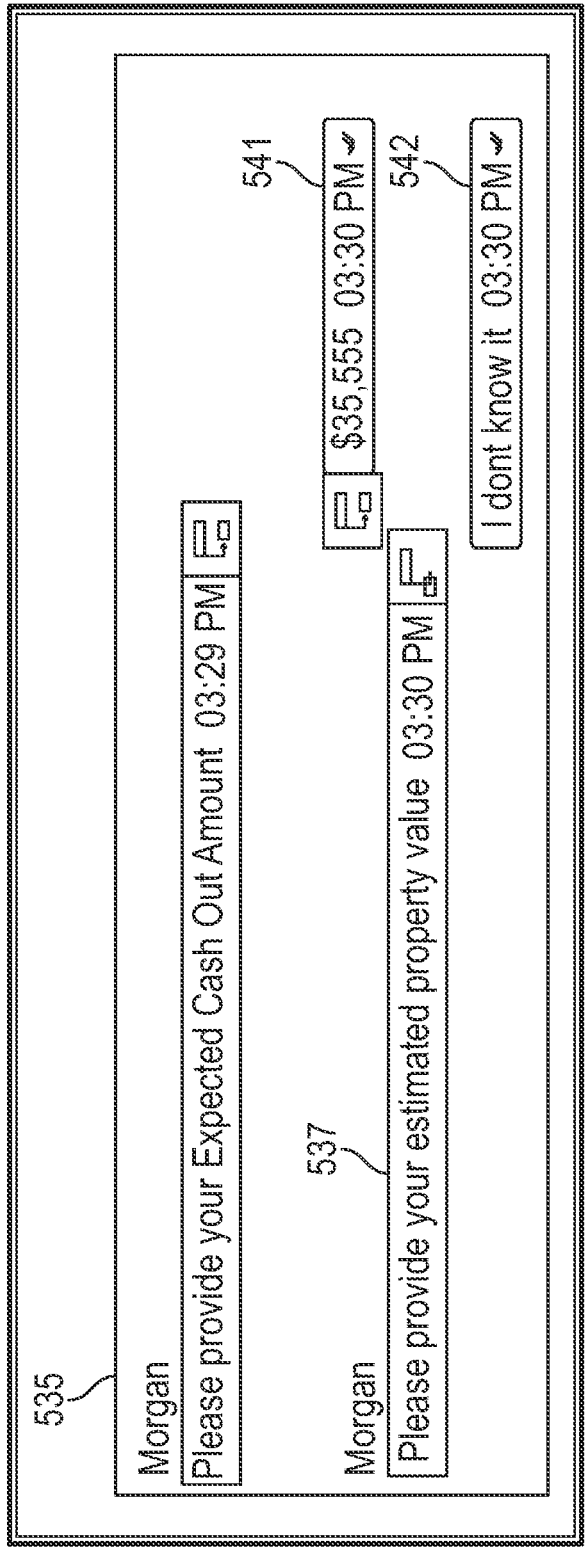

Once in "pause mode", the AA will attempt to help the user. For example, AA may ask the user whether "It is OK to continue now?" and if the answer is "Yes," then the HA will hit the play button, 531 in FIG. 5F allowing the process to continue. Further, upon pressing the play button 531 (i.e., removing the pause) the last question 537 that the user had difficulties with will appear again on the screen, as illustrated in FIG. 5G. In some embodiments, the suggestion for the answer may also be generated, e.g., 542.

In some embodiments, the user may receive additional instruction from AA or HA which will then be incorporated into the response. The user may continue responding to the remaining questions and finish the multi-step process. By having AA explain to the user the question results in a timelier response and higher customer satisfaction.

Figure 5H:
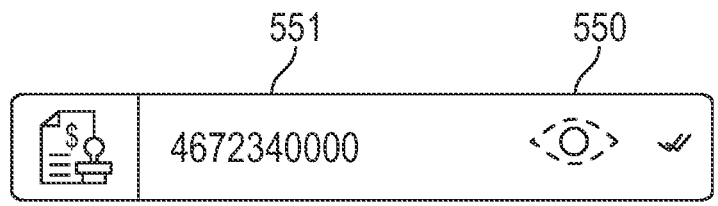
FIGS. 5H-5I illustrate example data masking function, according to an implementation of the disclosure.
Figure 5I:
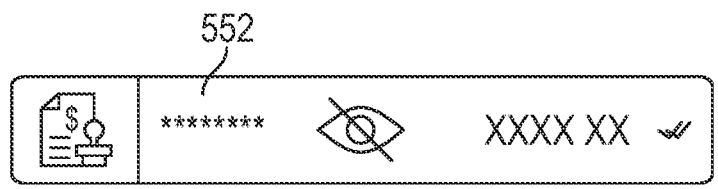
Figure 6D:
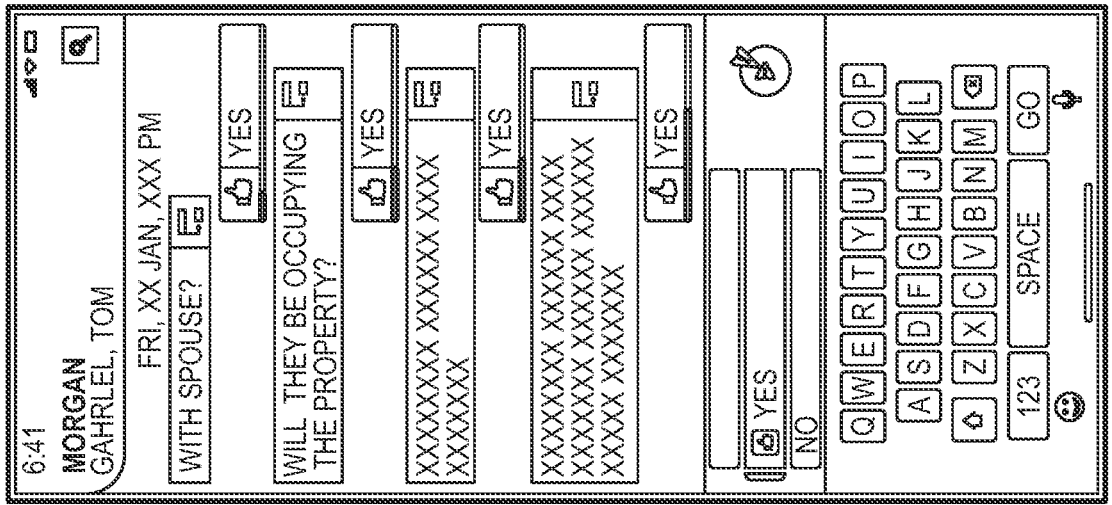
Figure 6E:
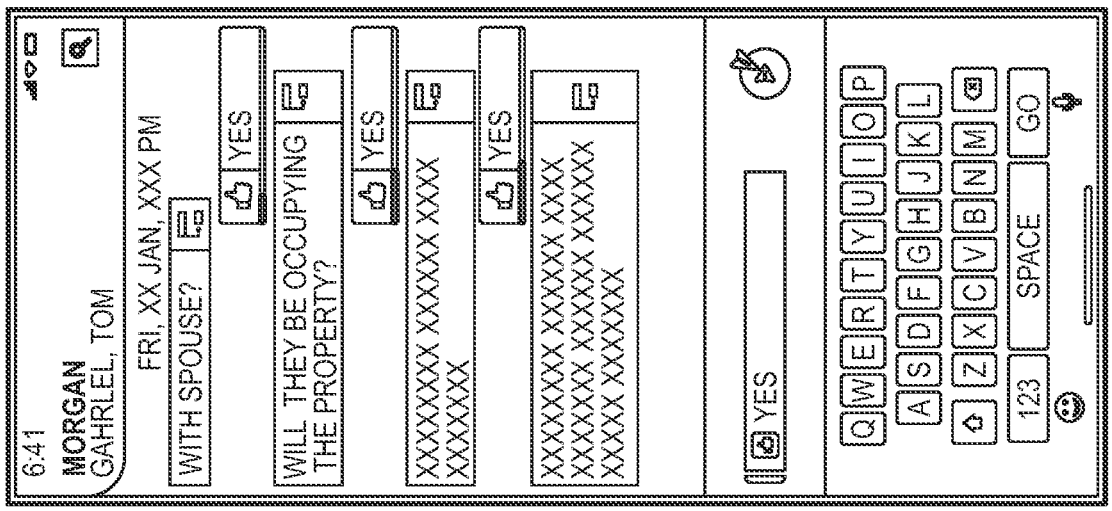
Figure 6F:
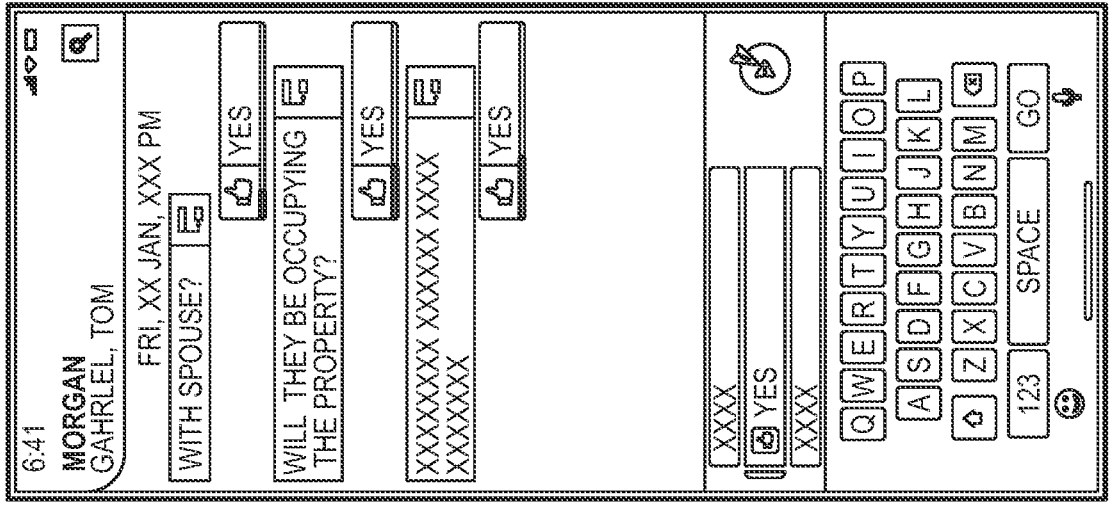

In some embodiments, the user may be asked to provide user personal identifiable information (PII) and/or other confidential information via the chat interface. For example, phone number, address, income, SSN, account number, and so on. However, users may not wish for that information to remain visible via the chat interface on display and potentially viewed by bad actors. To protect user identifiable information and/or other confidential information, the system 100 allows the user to use a data masking feature, as illustrated by button 550 in FIG. 5H. The button 550, represented by an icon comprising an "eye", will be included on the top bar of the chat interface. Additionally, the button 550 will be available on every input line. By pressing the button 550, the user will indicate that the information in the message requires to be protected. For example, the user may want to hide the account number 551 in FIG. 5H by pressing the button 550. The client chat interface 127 will display the masked account number 552, as illustrated in FIG. 5I.

In some embodiments, the system may use machine learning algorithms to determine whether the data provide by the user is likely confidential or includes PII without user indicating so. Only the information that likely confidential or includes PII will be masked. Of course, the user may override the determination, if the information is not private. Over time, by utilizing user input (what is private and what is not), the algorithm may become more accurate.

Additionally, the user may indicate that the information is confidential by actually stating so. For example, the user may enter "Here is my confidential mailing address: "12339 185th street Cerritos, California 90703". By including that term "confidential", the user ensures that the mailing address will be masked. Similarly, the user may enter the mailing address first and the subsequently follow-up by stating "btw, keep that confidential." FIGS. 6A-6F illustrate example conversations between the user and both AA and HA.

In some embodiments, as alluded to earlier, the client chat interface 127 provides users with a way to track the progress (i.e., how much of the application has been completed). Because the chat interface is constantly being updated with user provided information, much more he has to go to complete a task was a challenge.

Figure 7B:
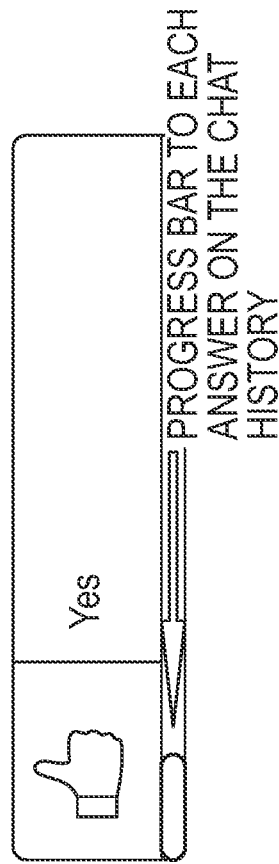
FIGS. 7A-7B illustrate an example workflow progress, according to an implementation of the disclosure.
Figure 7A:
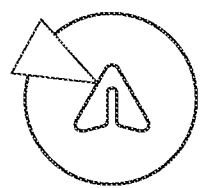

Unlike a simple progress bar used by the web form-based systems, the present embodiments, show the percentage completed by treating the send button as a "pie chart", as illustrated in FIG. 7A. Additionally, the system displays the progress bar with every question, since it's a conversation it requires to have the progress for each topic to be determined and displayed, as illustrated in FIG. 7B.

In some embodiments, the machine learning algorithm estimates remaining questions and determines a percentage completed. However, since the next question depends on the previous answer, the system will reshuffle the workflow with each answer and the question list (quantity and order) changes and hence the percentage completed can change with each answer. As each question is answered, a new percentage completed is computed, and the bar under all prior questions and the pie chart on the send button dynamically change to the new percentage completed. All of that happens automatically and then the next appropriate question is asked by the AA.

If the user deviates from the workflow and starts asking additional questions and/or information that wasn't anticipated by the system, the system will learn to enhance the workflow.

Figure 8C:
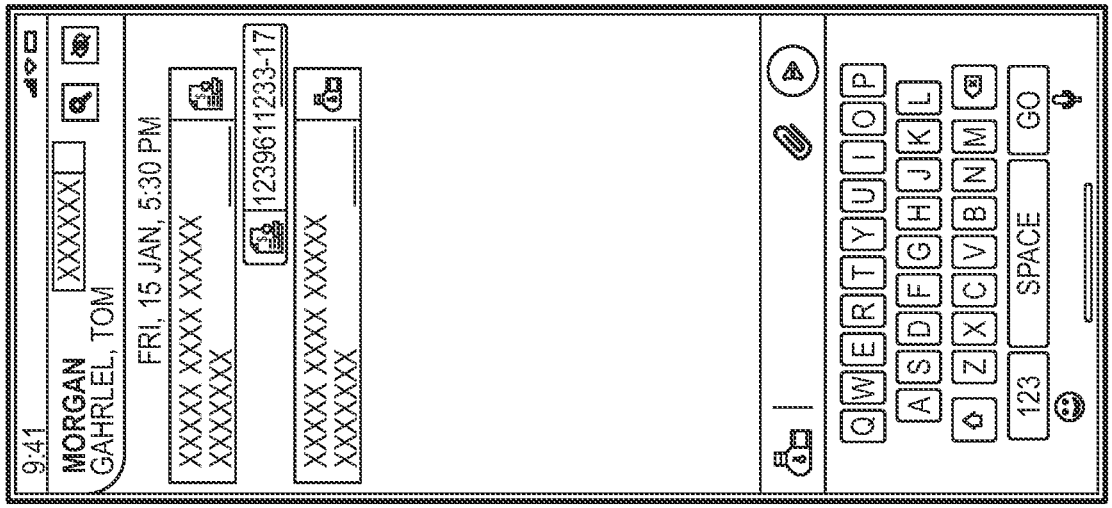
FIGS. 8A-8L illustrate example conversations and document attachment process, according to an implementation of the disclosure.
Figure 8B:
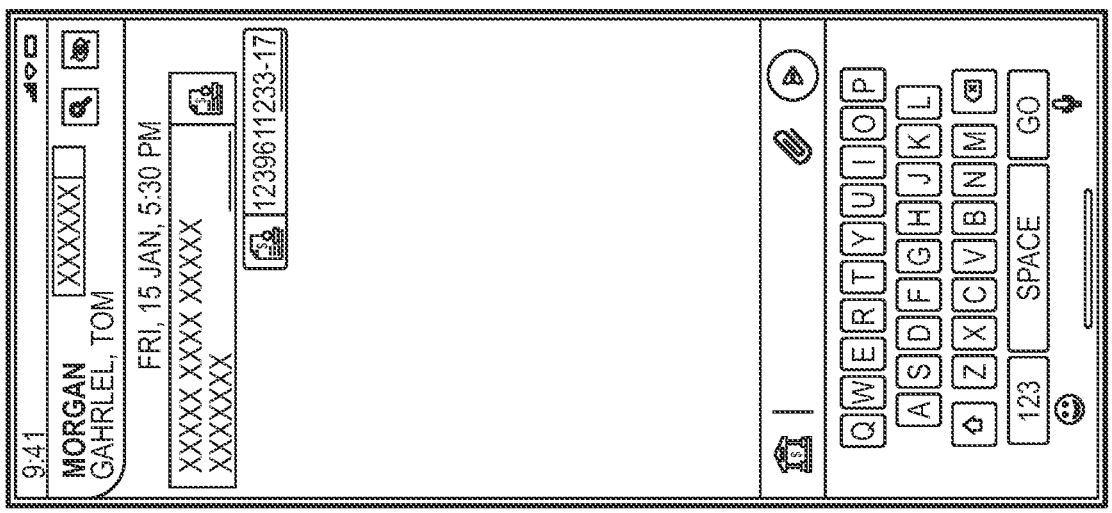
Figure 8A:
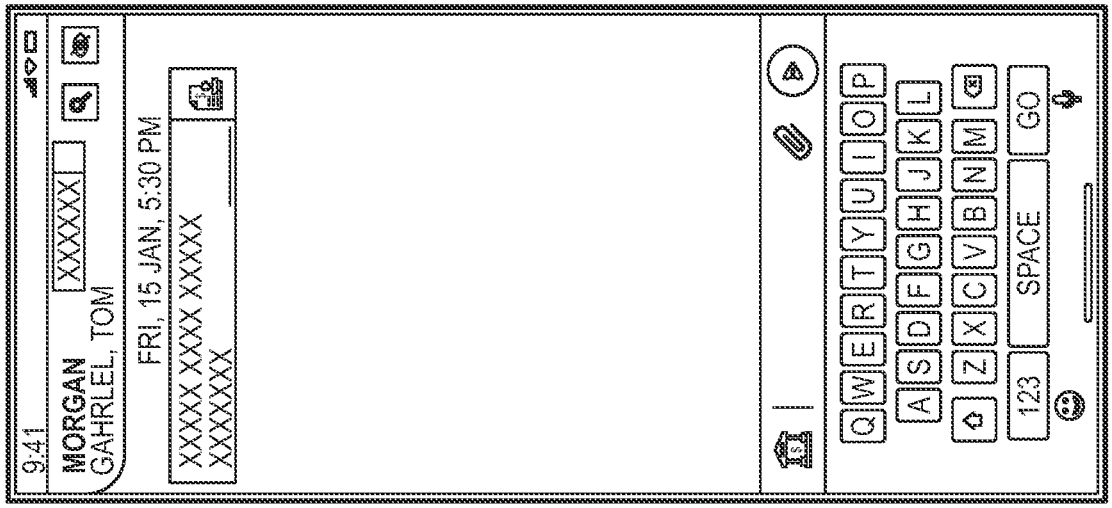

FIGS. 8A-8L illustrate example conversations between the user and both AA and HA. For example, in FIG. 8A, the HA asks the user for the loan number. In response, in FIG. 8B, the user sends the loan number. In FIG. 8C, the AA asks the user for the loan number.

The AA may determine that the loan number (i.e., a unique identifier) is associated with a previously started application and is actually a folder within the system. Subsequently, the AA will let the user know that the conversation is now related to the Loan number, as provide in 8B. Alternatively, if the AA was not able to determine that the Loan number is a folder, then the user may drag the icon associated with the Loan number towards the input provided in 8B to let AA know that this loan number is a folder.

Figure 8D:
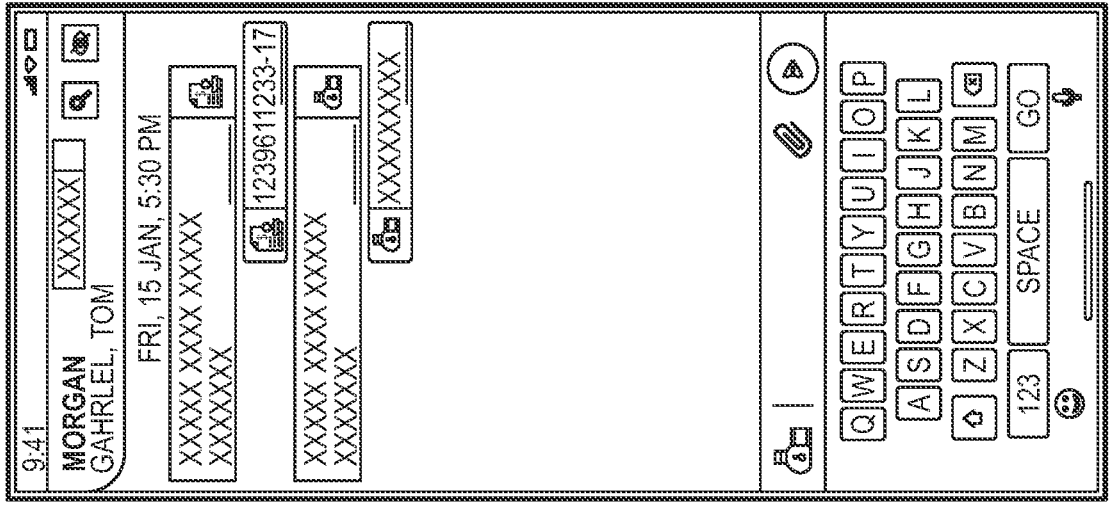
Figure 8E:
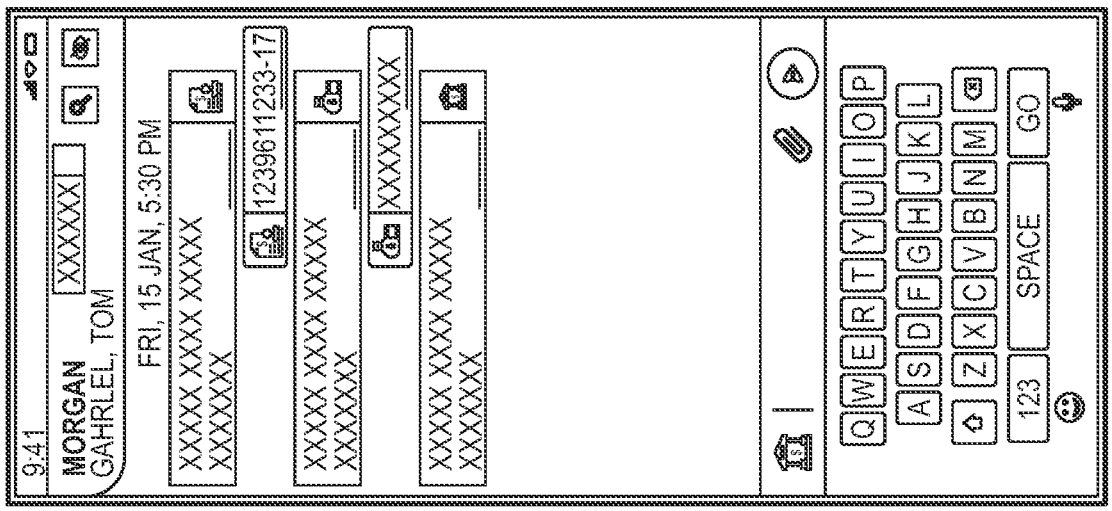
Figure 8F:
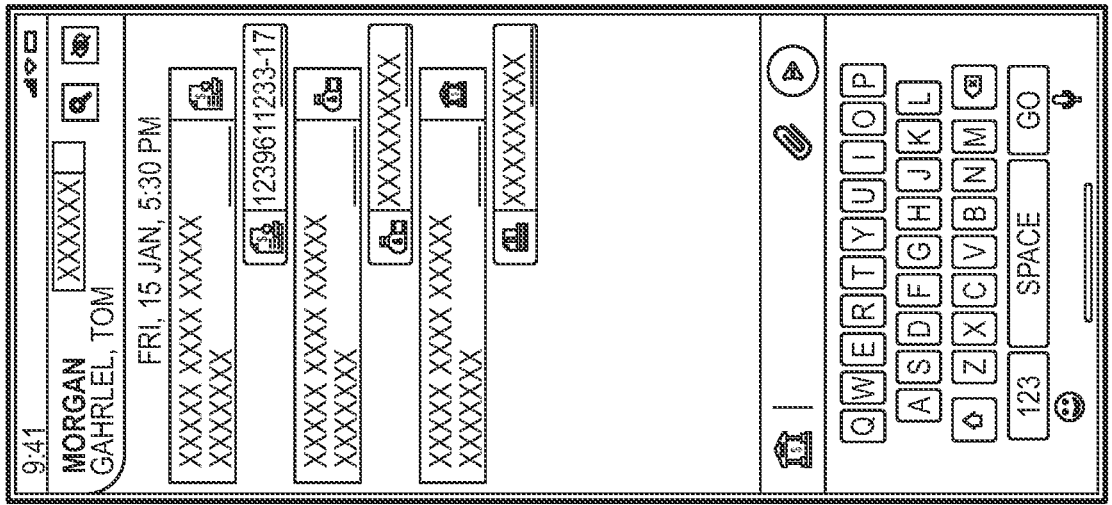

In FIG. 8C, the HA asks for the Loan Amount that then will be attached to the loan number already shared, and in FIG. 8D, the user provides the Loan Amount. Next, in FIG. 8E, the HA asks for the bank account number, and in FIG. 8F, the user provides the bank account number.

Again, since bank account number is a folder, and more specifically a sub-folder under the loan number, the bank account number will display on the title bar after the loan number icon. After bank account number is shared, the top bar showing the loan number will now show the bank account number as a path meaning the loan number icon will go to left corner and now show the new icon with the bank account number.

Figure 8I:
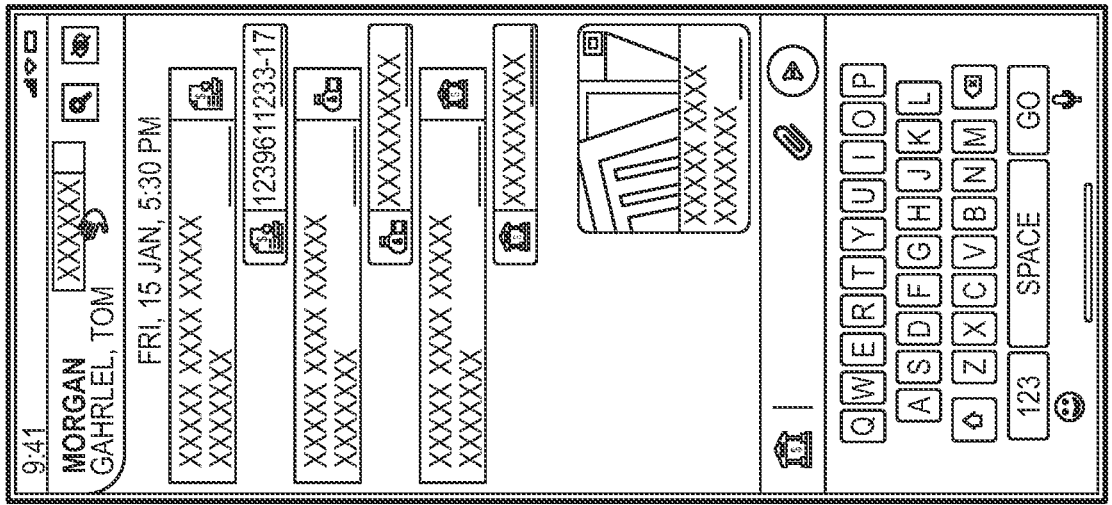
Figure 8H:
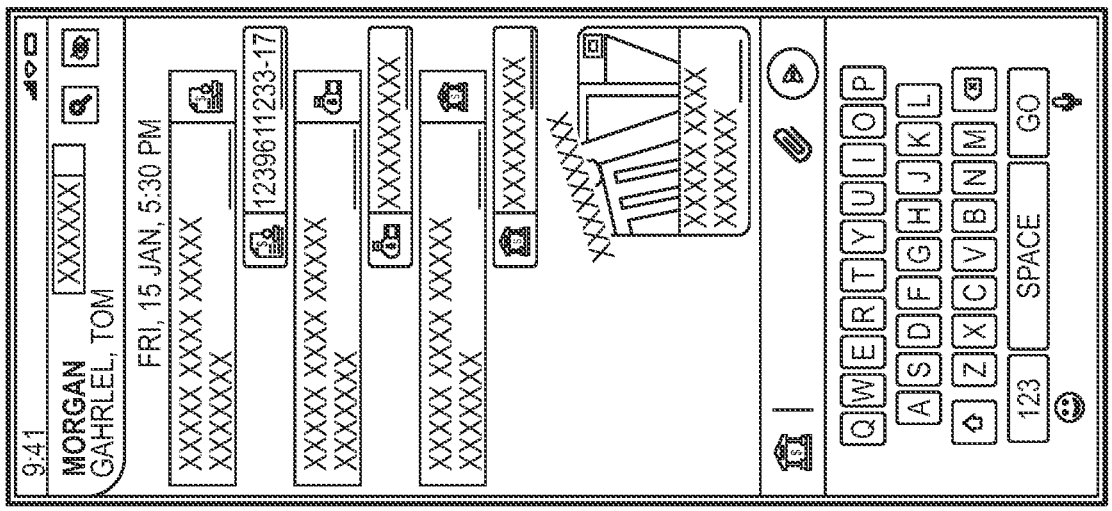
Figure 8G:
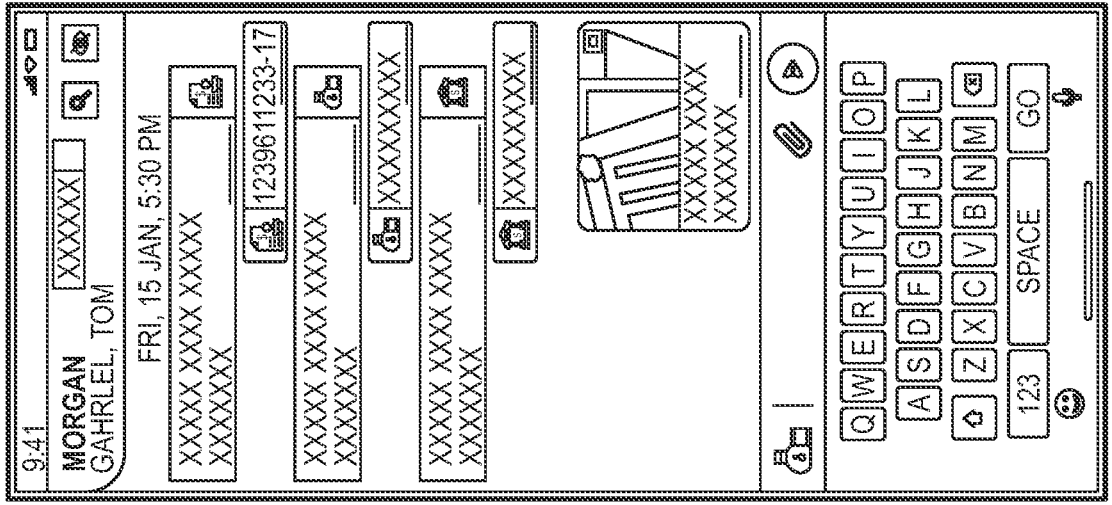
Figure 8J:
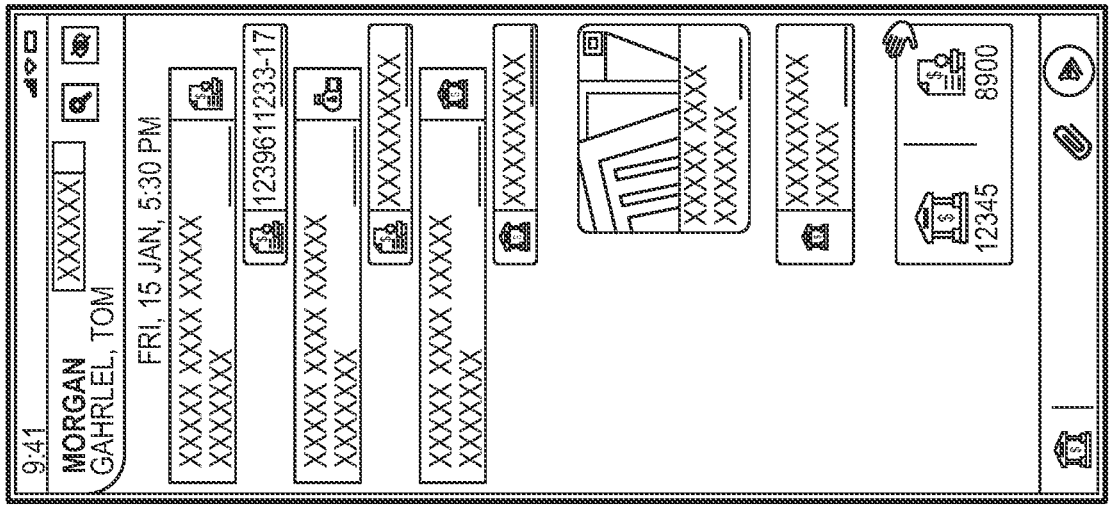

In FIG. 8G, the user sends a document to be part of the bank account to be stored in the system. The system will then auto-attach it to the number above. Also, the user will be able to click and drag the number on top to the document they wish they want to be part of that topic and in records stored. In FIG. 8H, the user clicks and drags the number to the document they want to attach it to. In FIG. 8I, the user wants to check whether they had the correct loan number. The user is able to click on the top bar icon that represent loan number to verify the number. In FIG. 8J, after the user verified the loan number, the top bar shows the latest topic rather than the bank number.

Figure 8K:
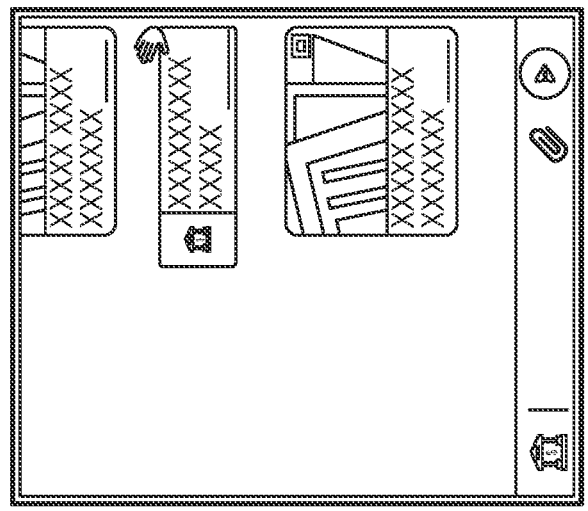
Figure 8L:
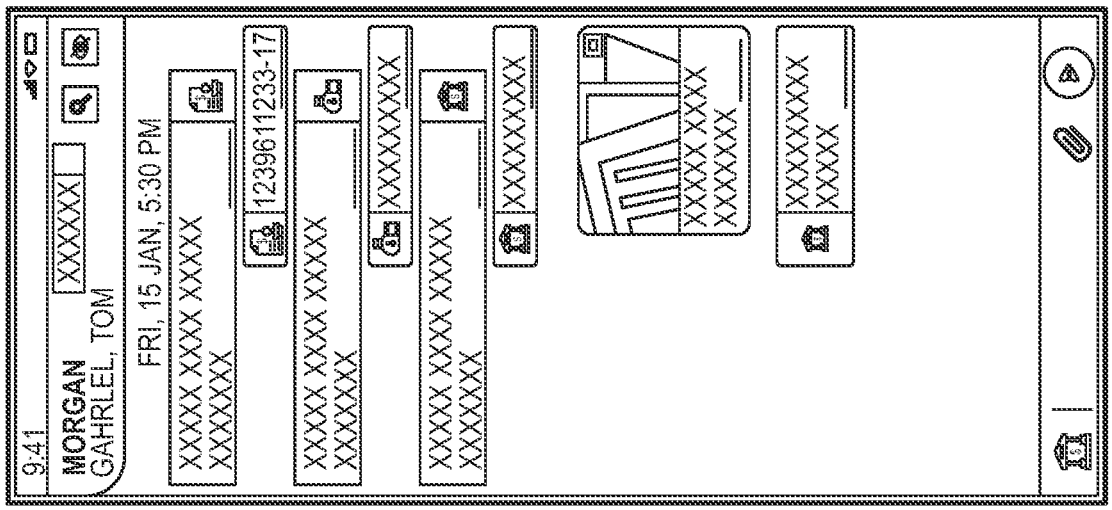

In FIG. 8J, after all attachment have been successfully attached, a message communicated that will be generated. Now if the user wants a quick way to see again the path of the documents stored, they can click on the thumbnail, as illustrated in FIG. 8K. Next, in FIG. 8L, the thumbnail image will flip (like a coin) showing the path (i.e., loan number and loan amount) on its back.

In some embodiments, a set of icons representing a real-world object or action and/or emotion database of icons may be used by the system. In particular, the system may categorize questions and responses (either from AA/HA or from the user) with respect to a workflow category, an action the user is attempting, and/or user's emotions by using an icon. Some icons may have keywords associated with them and explaining what the relationship between the icon and emotion or the real world objects is.

In some embodiments, the client chat interface 127 may determine an icon for an object that best fits a particular real-life object or emotion for a particular user (e.g., example loan amount, interest rate, name, password, telephone number, birth date, and so on). The icon will be selected and associated with the object or emotion. The icon selected by the system will remain unchanged for that user's object or emotion. By using the same icons for the same objects, the client chat interface 127 prevents the user from getting confused or lost in a long message exchange thread.

Figure 9:
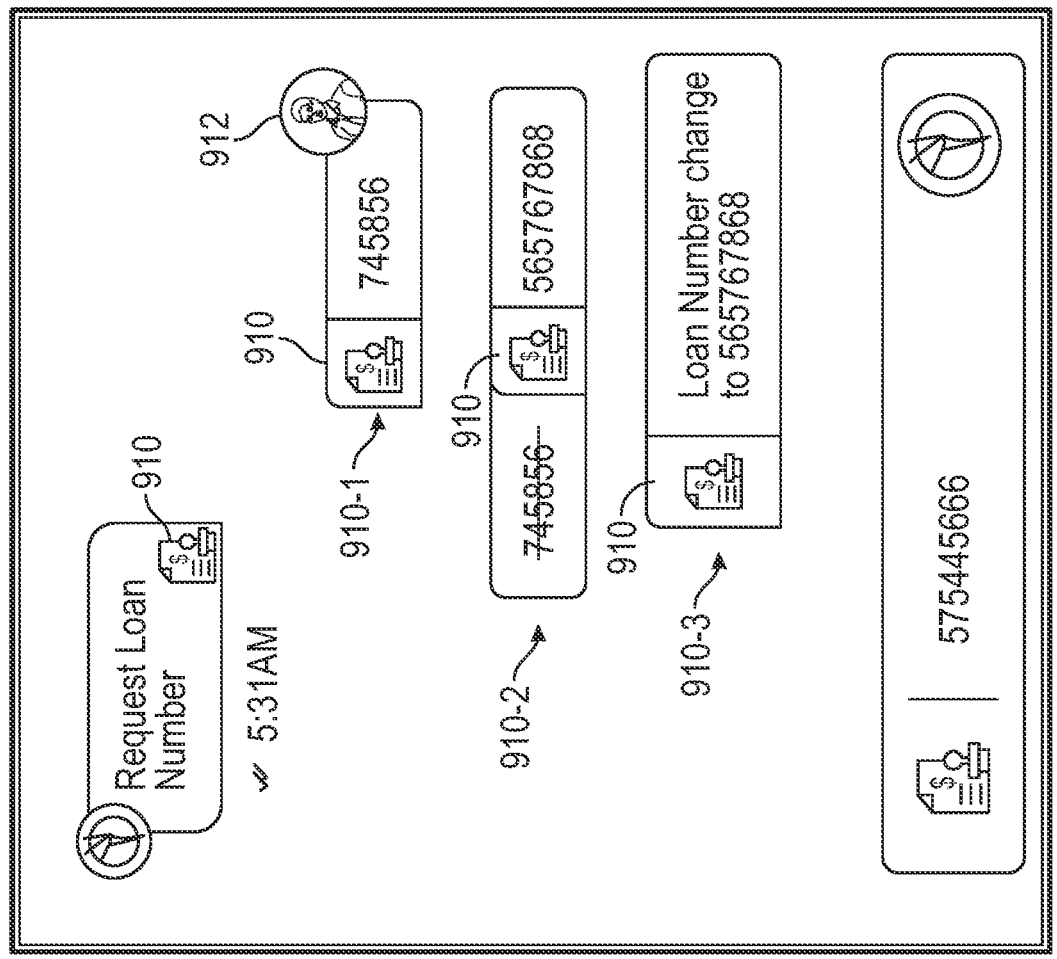
FIG. 9 illustrates an example contextual icon generation, according to an implementation of the disclosure.

For example, as illustrated in FIG. 9, icon 910 is associated with loan number for user 912. Next, user 912 provides loan number in response 910-1. Subsequently, when user 912 realizes that they provided erroneous loan number and updated the number in response 910-2, the client chat interface maintains the same icon 910 when correcting the loan number in response 910-3. In other words, the client chat interface automatically attaches the loan number icon with any responses or messages related to the loan number.

Alternatively, if the user's response doesn't correspond to the loan number (e.g., the user simply states "I don't know"), then the client chat interface may determine that the user did not answer the question and instead responded with additional data. the client chat interface 127 may employ one or more machine learning algorithms or other techniques as described above, to validate the response and question pair. Upon determining that a response provided by user is not responsive to the question asked, the message would be displayed on the message exchange thread without the icon, thus alerting the user to provide the missing data.

Figure 10A:
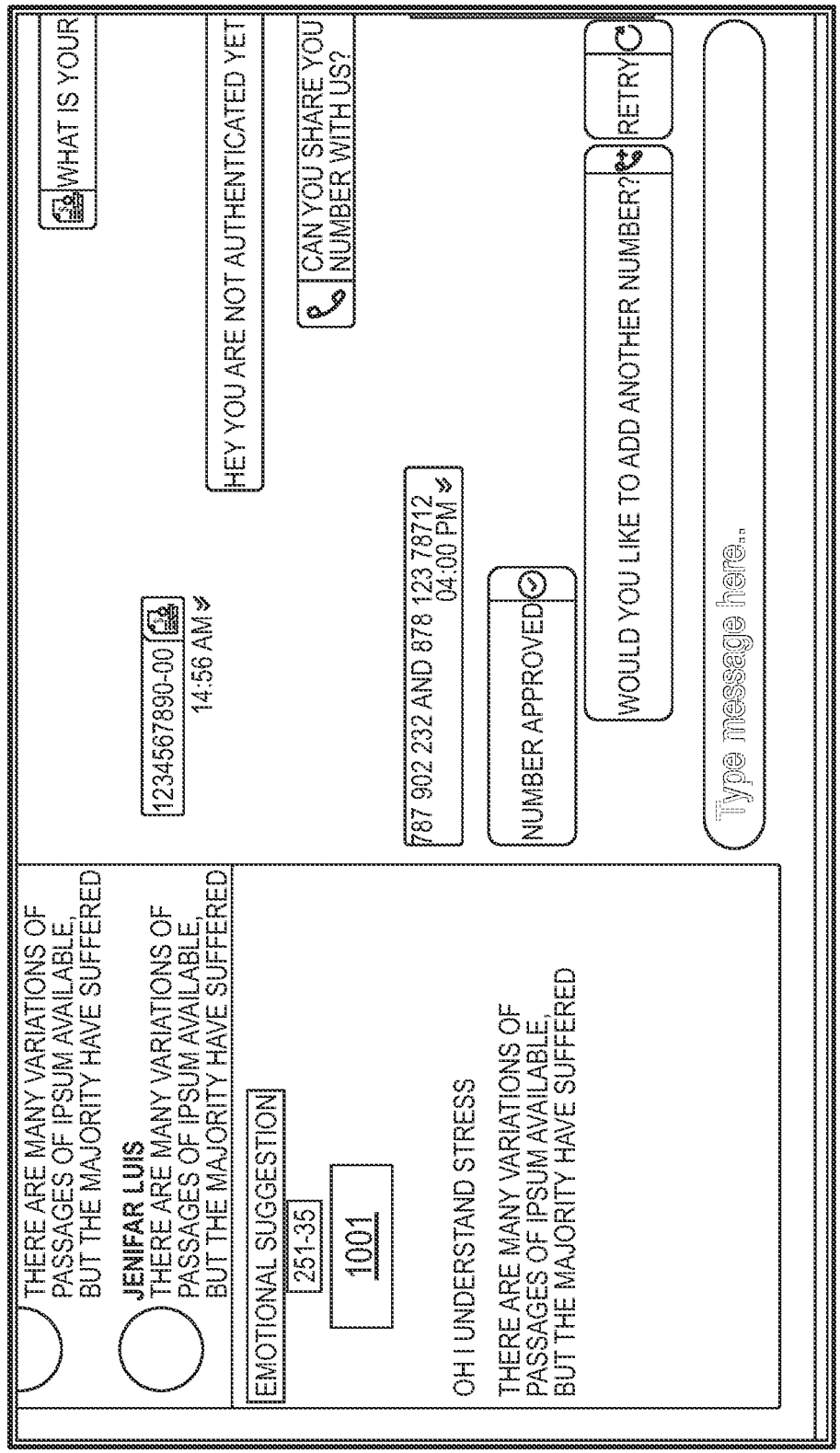
FIG. 10A illustrates example emotional suggestions generated by an AA, according to an implementation of the disclosure.

As alluded to earlier, the AA "learns" about the customers personality and emotional state and may the generate an emoji that is most fitting to represent user's emotional state. For example, as illustrated in FIG. 10A, AA may generate an emoji, based on the context of the conversation and/or other user's input (facial expression, actual responses), and remind the HA to user more emphatic language when interacting with this particular user.

In some embodiments, the system may apply natural language processing ("NLP") techniques to identify and extract the data related to user's input. Typically, the data will include a noun, describing an object related to the goal of the form-based application (e.g., a loan, a loan application, closing documents, W2, and so on). By applying one or more NLP processing techniques, the system can gain understanding as to the exact nature of user's request.

Next, the system will classify the intent, i.e., the purpose or goal that the user is pursuing using the NTL. In other words, the system is configured to determine what the user intends to accomplish. For example, the intent may be coaxed out of user's requests, e.g., "I want to know the status of (my loan, my loans application, my loans closing)" and "I would like to apply for a loan."

The combination of the two distinct functions above allows the system to determine user's intent which is often conveyed with unique and subtle communication patterns that differ from person to person.

Next, the system is configured to dynamically compose a response in a way that feels more like natural conversation than program output. First, the system provides the response in a way that flows by tasking the HA (the transformer) with responding in a way that is uniquely resonant with the style/tone of each conversation/user.

Note, the content that the system responds with is independent of the style used to communicate that content, however, in real-life, humans talk about the same content in very different ways with different people. Thus, an assumption that everyone's style of communication has an element of nuance exists. The AA (transformer) may be configured to determine the structure and style of the user's response in a way that considers the style and tone of the overall conversation to, for example. The AA may encourage someone with a negative, less-positive, less-enthusiastic disposition; or reinforce a positive sentiment/tone and encourage a "good vibe", while responding to the basic need (i.e., question).

Figure 10B:
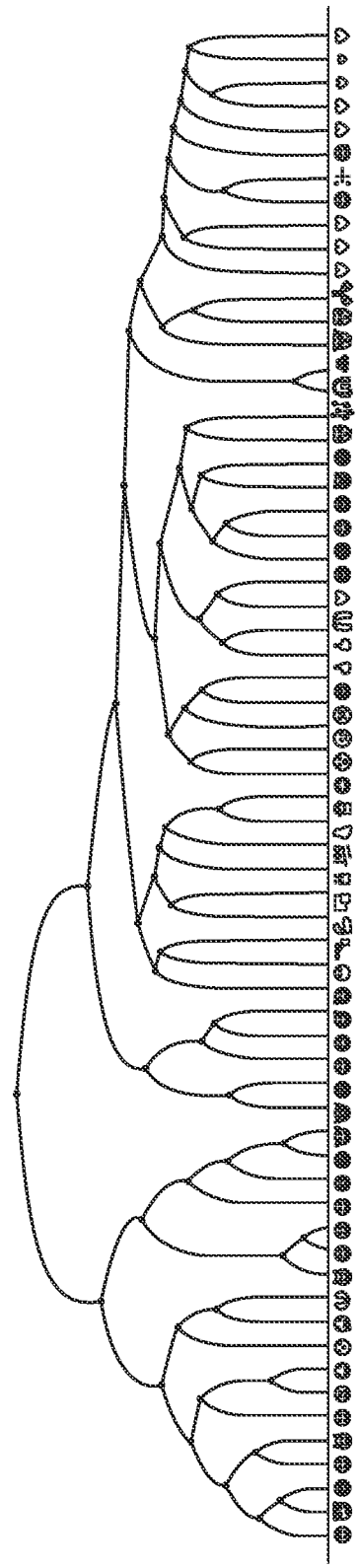
FIG. 10B illustrates an example emoji distribution, according to an implementation of the disclosure.

The data reflecting user's emotions is obtained by emotional prompting in the conversation, as a means of overtly soliciting, coupled with inferring on any sentence which isn't purely a data transaction. Next the data related to user's emotions is categorized, by using one or more classifiers (e.g., a deepmoji MIT opensource classifier), on the provided input comprising sentence/tokens. In response, the system receives an emoji distribution, as illustrated in FIG. 10B, which can be used to select the top result from.

Figure 10D:
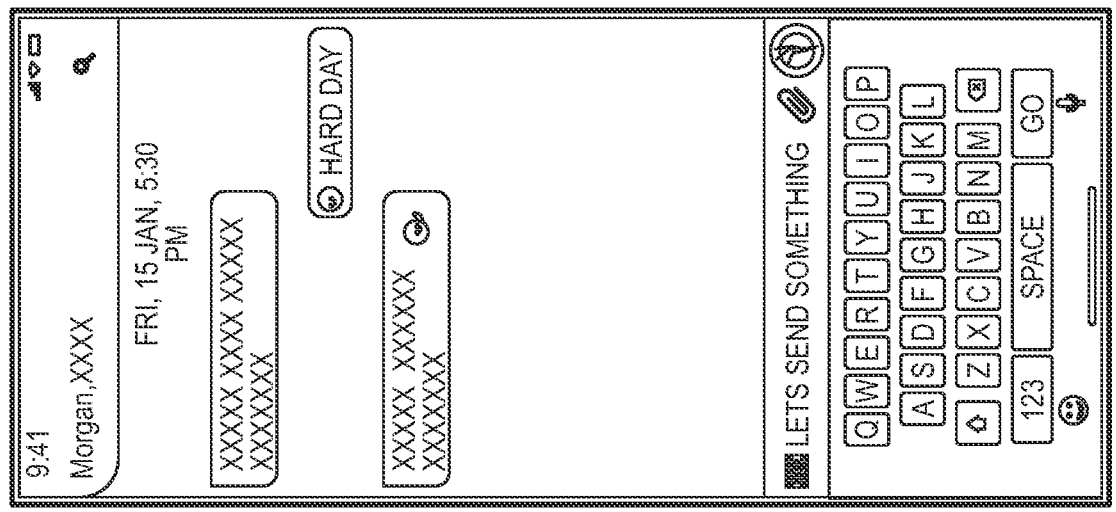
FIGS. 10C-E illustrate example emoji suggestions generated by an AA, according to an implementation of the disclosure.
Figure 10C:
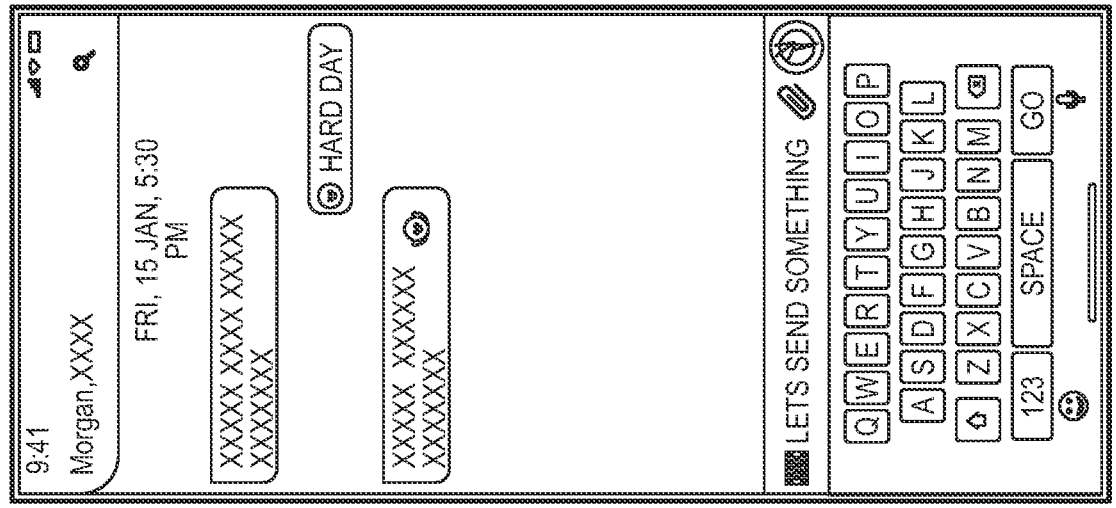

In some embodiments, the system may be configured to generate one or more emojis based on user's response or question to the message by AA or HA. The emoji may be incorporated into the response that the AA or HA sends to the user to communicate more precisely how the AA or HA feels about the other user's comment in order to allow for a more emotional, empathetic, and "human" conversation between users. For example, FIG. 10C, the user sends a sad face emoji, in repose, the HA sends an open hug showing the care and compassion to the user. Some emojis may have a movement associated with them (e.g., a two second side to side movement) to further show emotional involvement of HA or AA. For example, in FIG. 10D, the emoji sent by AA or HA in response to the user's sad emoji reacted via movement, further assuring the user that AA or HA understands how they feel.

Figure 10E:
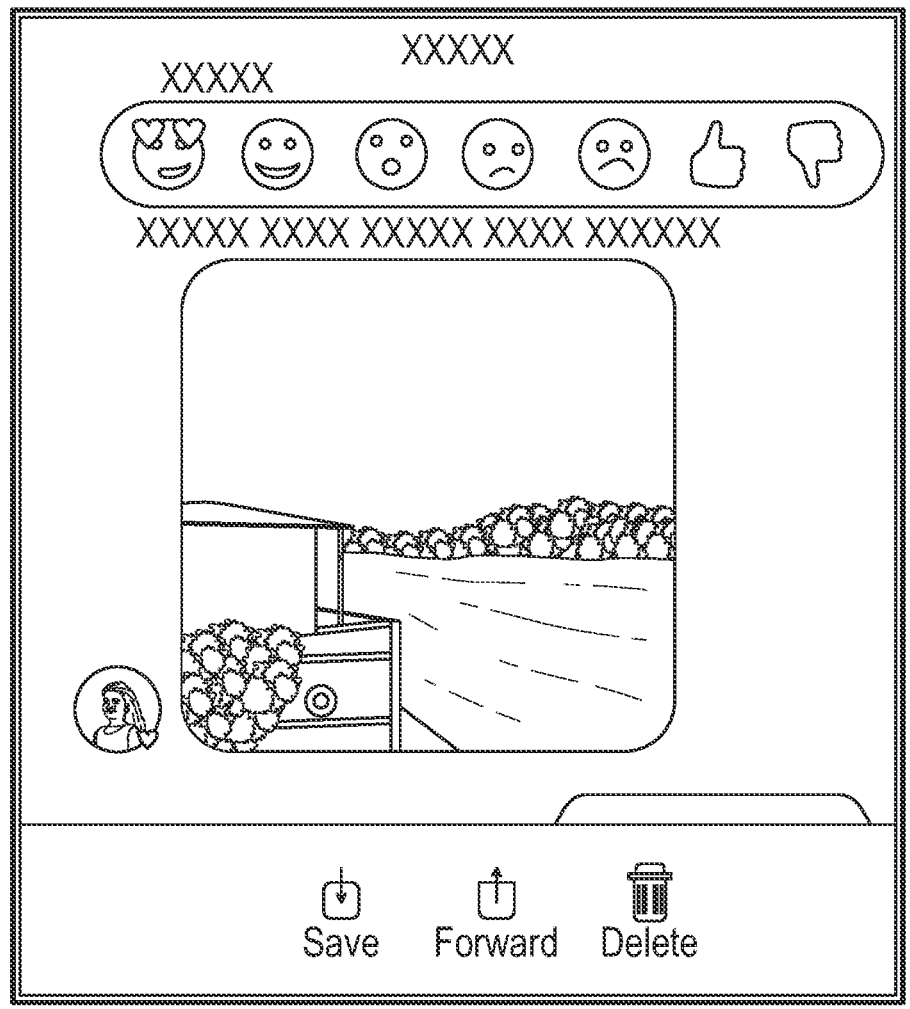
Figure 10F:
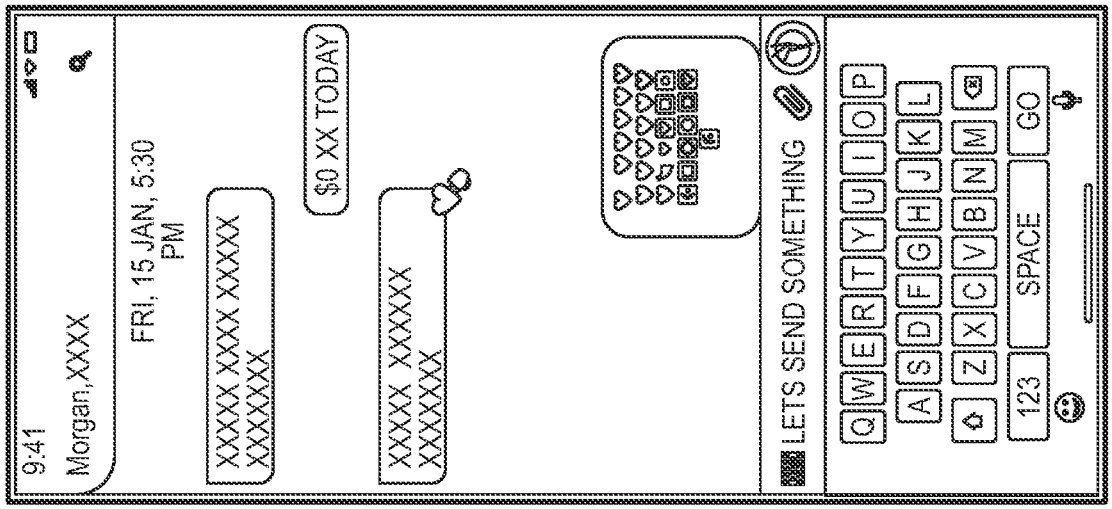
FIGS. 10F-H illustrate example emoji drag and drop suggestions generated by an AA, according to an implementation of the disclosure.
Figure 10G:
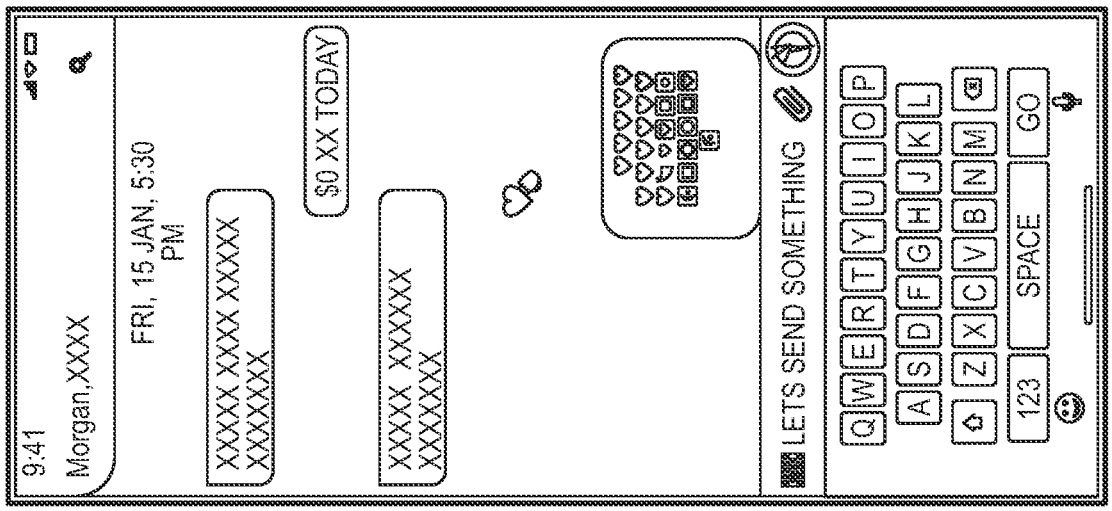
Figure 10H:
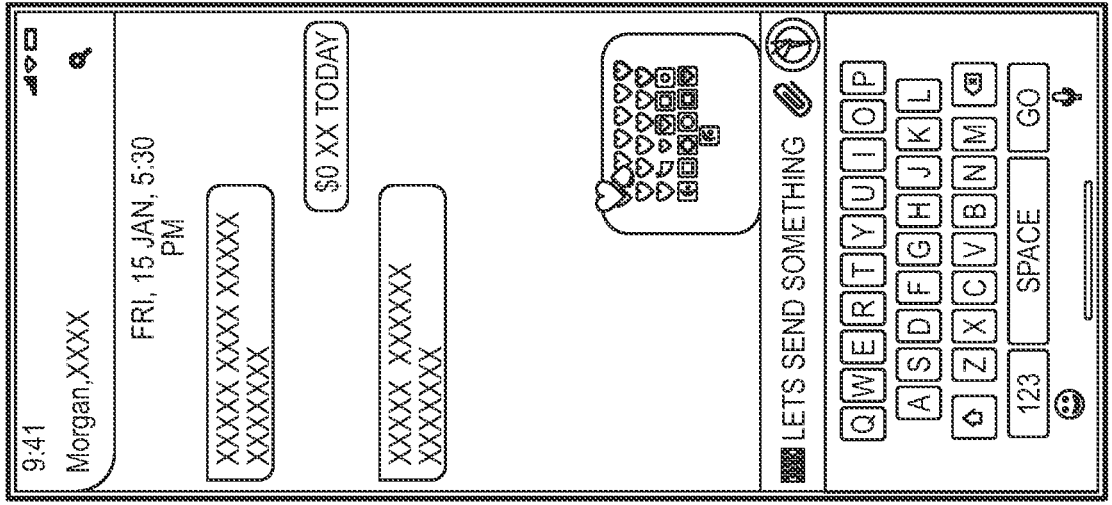

In other embodiments, the system may be configured to generate one or more emojis in response to an emoji sent by the user automatically, rather than waiting for AA or HA to react, for example, as illustrated in FIG. 10E. In some embodiments, the system may be configured to accept emoji reaction in response to user's message by having the HA dragging and dropping the emoji from the keypad, as illustrated in FIGS. 10F-10H. For example, HA will be able to select the emoji they like most for the reaction (e.g., in FIG. 10F), drag it (e.g., in FIG. 10G) on top of the chat bubble containing the message that they wanted to react to, and drop it (e.g., in FIG. 10H). By utilizing this approach of dragging and dropping emojis results in faster and more personalized reactions to user messages.

In some embodiments, the system may be configured to allow one user to include one or more additional users into their current conversation with AA or HA within the chat interface of a client application 127 running on the client computing device 120, as illustrated in FIG. 1. For example, a mortgage applicant (i.e., a first user) may be having a conversation with AA and require input from their spouse or accountant of the applicant user (i.e., a second user). Rather than calling the spouse and asking them a question, the first user may invite the other user to join the conversation.

Figure 11A:
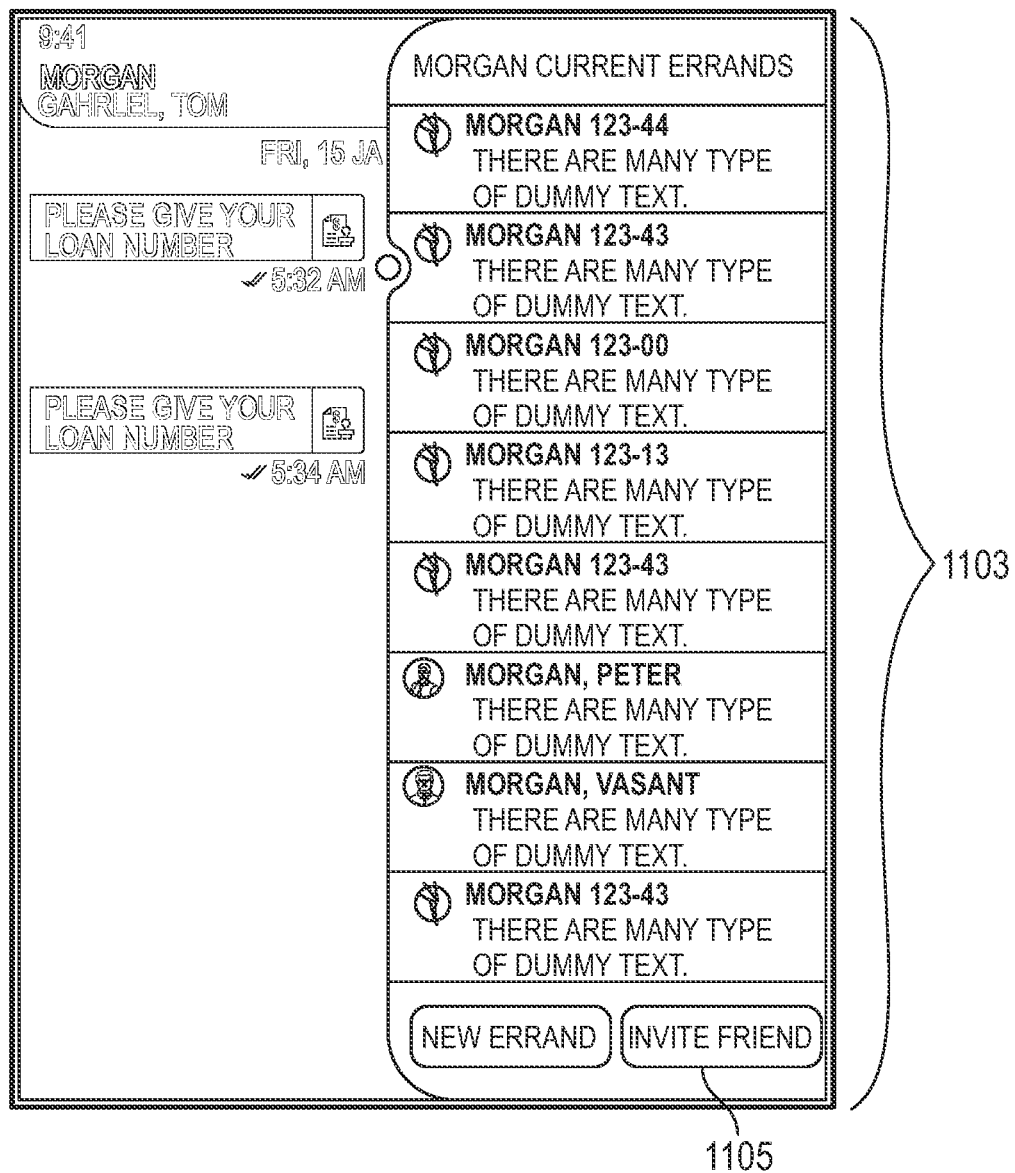
FIG. 11A-11C illustrates an example invitation of additional users into a current conversation, according to an implementation of the disclosure.

For example, as illustrated in FIG. 11A, a first user may send an invitation to a second user to join one of the active conversations 1103 between first user and AA (i.e., Tony, the first user, and AA Morgan). For example, first user may invite the second user to join one of the active conversations by pressing "Invite Friend" button 1105. By pressing the 1105 button, the first user will be asked to provide second user's contact information (e.g., second user's email or phone number). AA (or HA) will use the contact information to send the invitation to the second user. In some embodiments, the first user may provide contact information by using the "@" notation to cause a list of all contacts from the address book to appear, as the first user types the letters of the person's name. Alternatively, the first user may include second user's email or phone number. The invitation will include a link generated to access the conversation. The second user enters the conversation by clicking on the link provided in the invitation and entering their name.

Figure 11B:
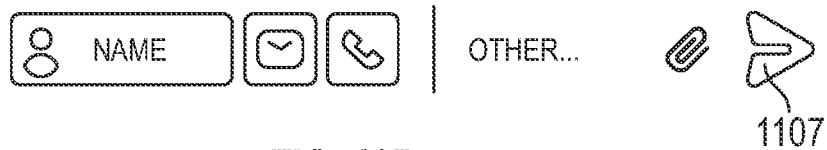
Figure 11C:
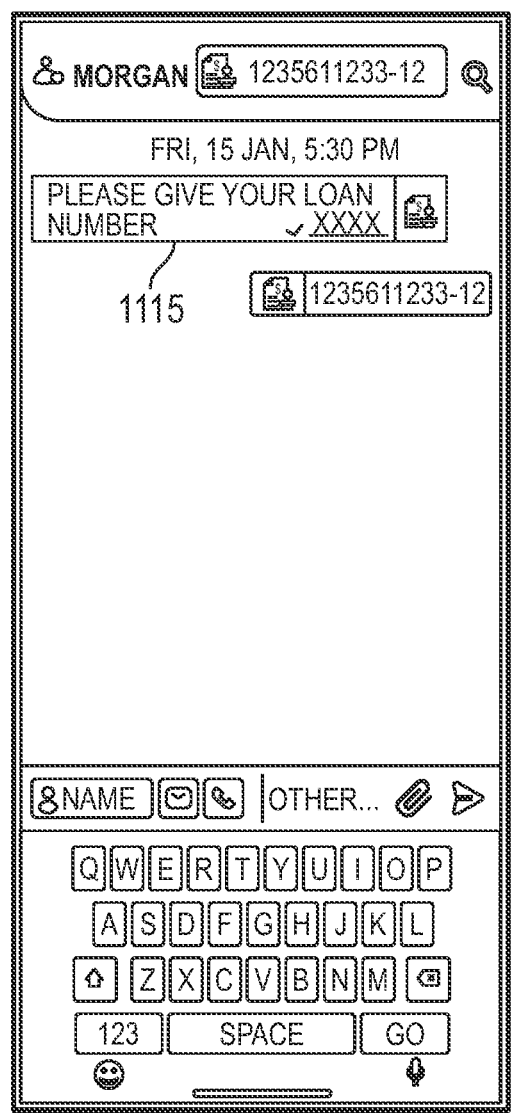

In other embodiments, the first user may request AA to invite the second user i.e., by sending an invitation to the second user to join one of the active conversations 1103 between first user and AA (i.e., Tony, the first user, and AA Morgan), as disused above. In response, an action will turn the icons next to text field to SLIPs. For example, as illustrated in FIG. 11B, the first user may be able to click on the converted SLIP to input the information. By virtue of providing the first user with the ability to input the information, allows the first user to fully control what the information shared with AA. Once the information is entered, the first user may send it to AA by possessing send button 1107 or flipping on the icon to direct it to a particular active conversation 1103. This allows AA to invite the second user based on the details provided by the first user. The first user is not required to complete all fields. Rather, the first user may select and choose which fields to complete. As illustrated in FIG. 11C, the first user may open the SLIP 1115 by selecting it (e.g., clicking on it). For example, an outline glow may be blinking around the SLIP 1115 to notify the first user of their selection and that the SLIP can be clicked.

Figure 11D:
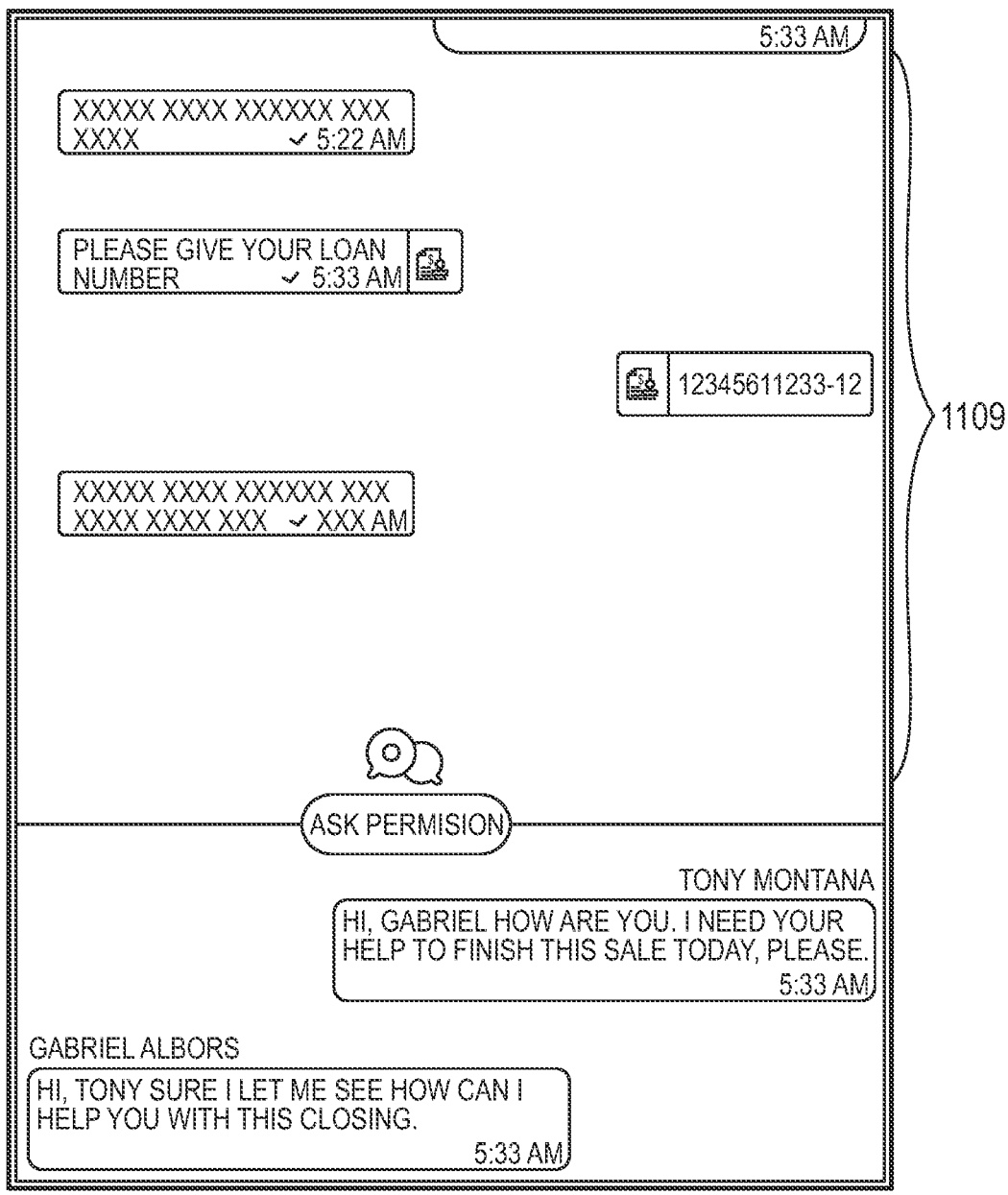
FIG. 11D illustrates example obscured messages exchanged prior to the new user joining the conversation, according to an implementation of the disclosure.

In some embodiments, once the second user enters the conversation, the messages exchanged between the first user and AA or HA, prior to the second user joining, will not be readable to the first user. For example, as illustrated in FIG. 11D, messages 1109 exchanged between Tony, the first user, and AA Morgan will not be visible to Gabriel, the second user, and will be blurred out. By obscuring the messages, the first user can maintain the level of confidentiality and only share information relevant to the second user.

Figure 11E:
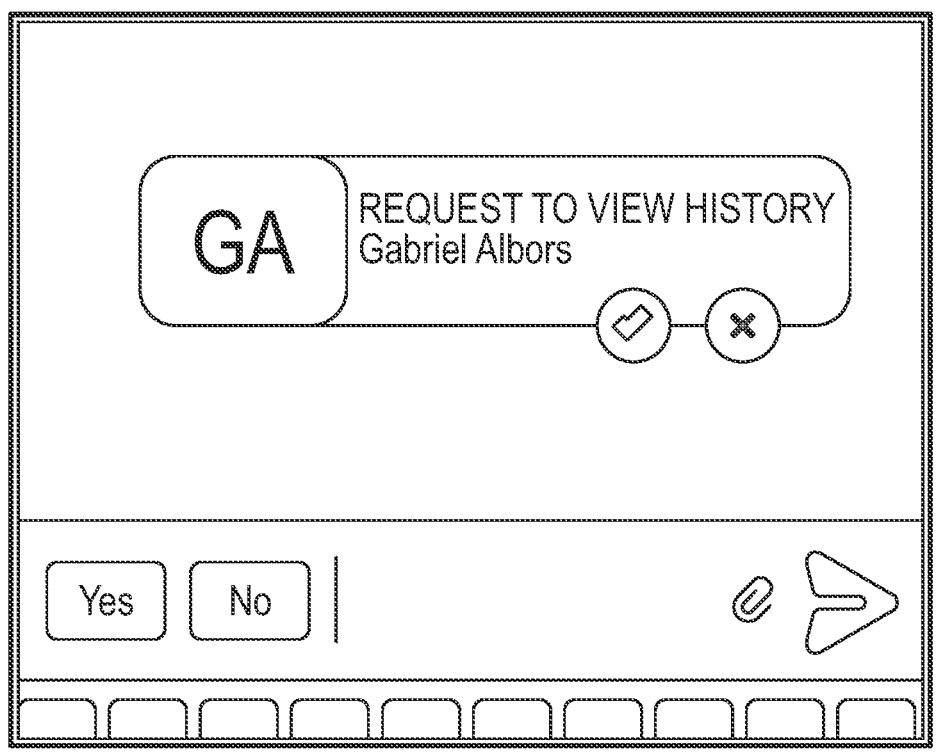
FIG. 11E illustrates example viewing messages exchanged prior to the new user joining the conversation, according to an implementation of the disclosure.

In some embodiments, the second user may request to view messages exchanged between the first user and AA or HA prior to the second user joining the conversation. For example, Gabriel, the second user needs to see the messages between Tony and Morgan the AA. looking for a mortgage. In particular, because Gabriel is Tony's accountant it is important to see what documents Morgan has requested from Tony. Accordingly, Gabriel can request to view complete conversation by asking permission from Gabriel. Tony will receive a notification informing him that Gabriel asked to "View History", as illustrated in FIG. 11E. Upon approving Gabriel's request, Gabriel will view previously exchanged messages without the blur or without any obscuring. Conversely, Tony may decline Gabriel's request thereby continuing to deny Gabriel's access to previous messages.

Figure 12A:
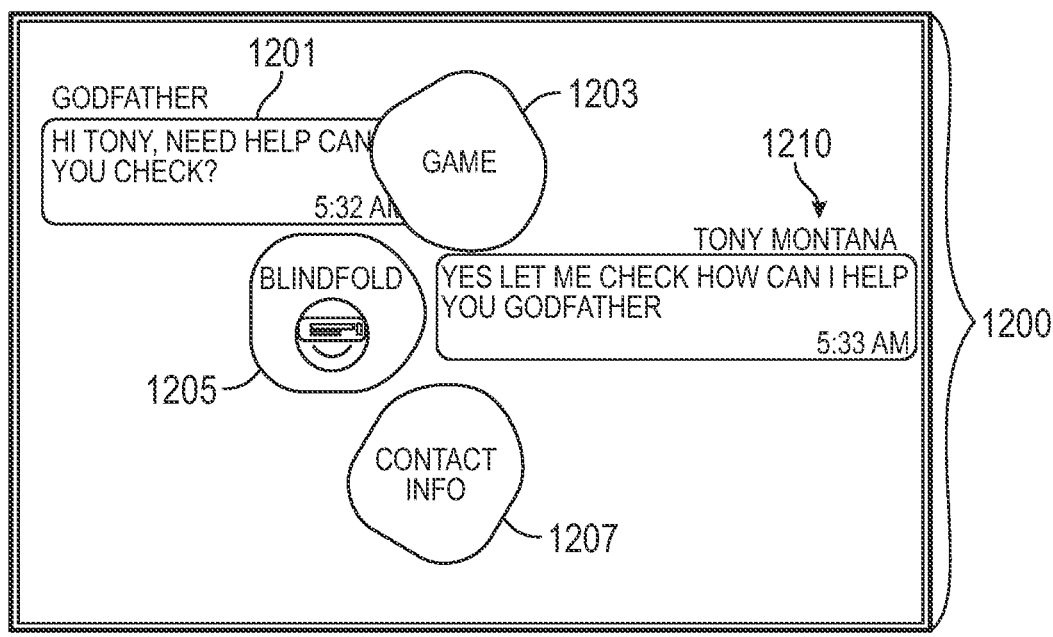
FIGS. 12A-12C illustrate example private conversation module, according to an implementation of the disclosure.
Figure 12B:
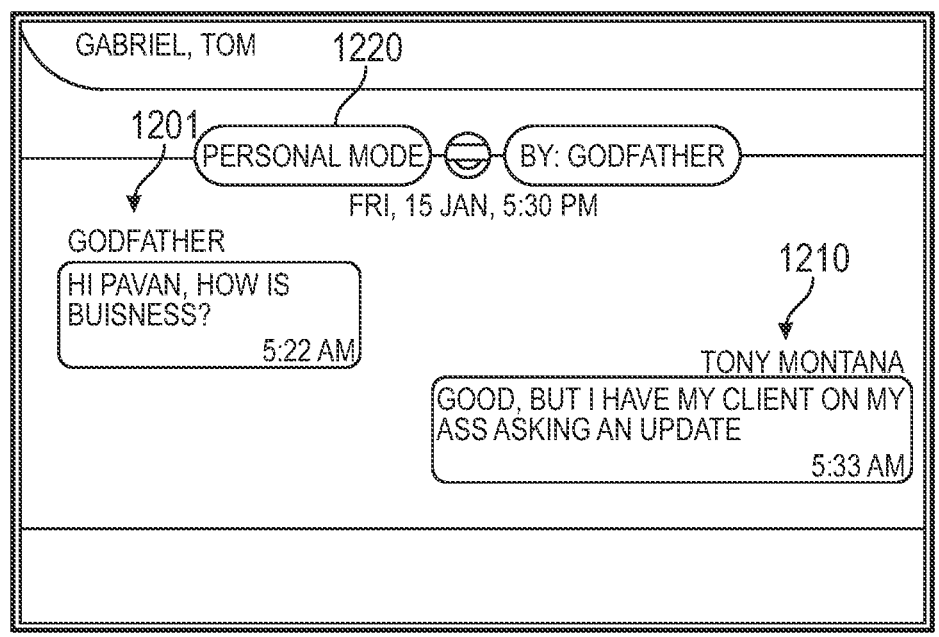

In some embodiments, the system may be configured to allow a user in a group conversation to have a private, separate conversation with each individual participant. For example, in a conventional messaging environment, when a user in a group conversation wishes to have a private or one-on-one conversation with one of the other users, that user most like would need to start a new, separate conversation. Furthermore, the users in a new, separate conversation may need to reference the old group conversation from time to time, causing confusion and delay, especially when the user is likely confused which conversation is new and private and which is not. The present embodiment allows users to have private conversations without leaving the main conversation. For example, as illustrated in FIG. 12A, in a group conversation 1200, one of the users, user "Godfather" 1201 may select another user "Tony Montana" 1210 with whom he wishes to have a private conversation. Upon selecting user 1210, user 1201 will be presented with three different options. Option 1203 "Game" will allow user 1201 to invite user 1210 to play a game. Option 1205 "Blindfold" will allow user 1201 to invite user 1210 to a private conversation. Finally, option 1207 will allow user 1201 to view user 1210 contact information. By selecting the second option 1205 "Blindfold", user 1201 will be able to have a private conversation with user 1210 without leaving the group conversation 1200. For example, as illustrated in FIG. 12B, the "blindfold" conversation 1220 will be private and will not be visible to anyone else except users 1201, 1210.

Figure 12C:
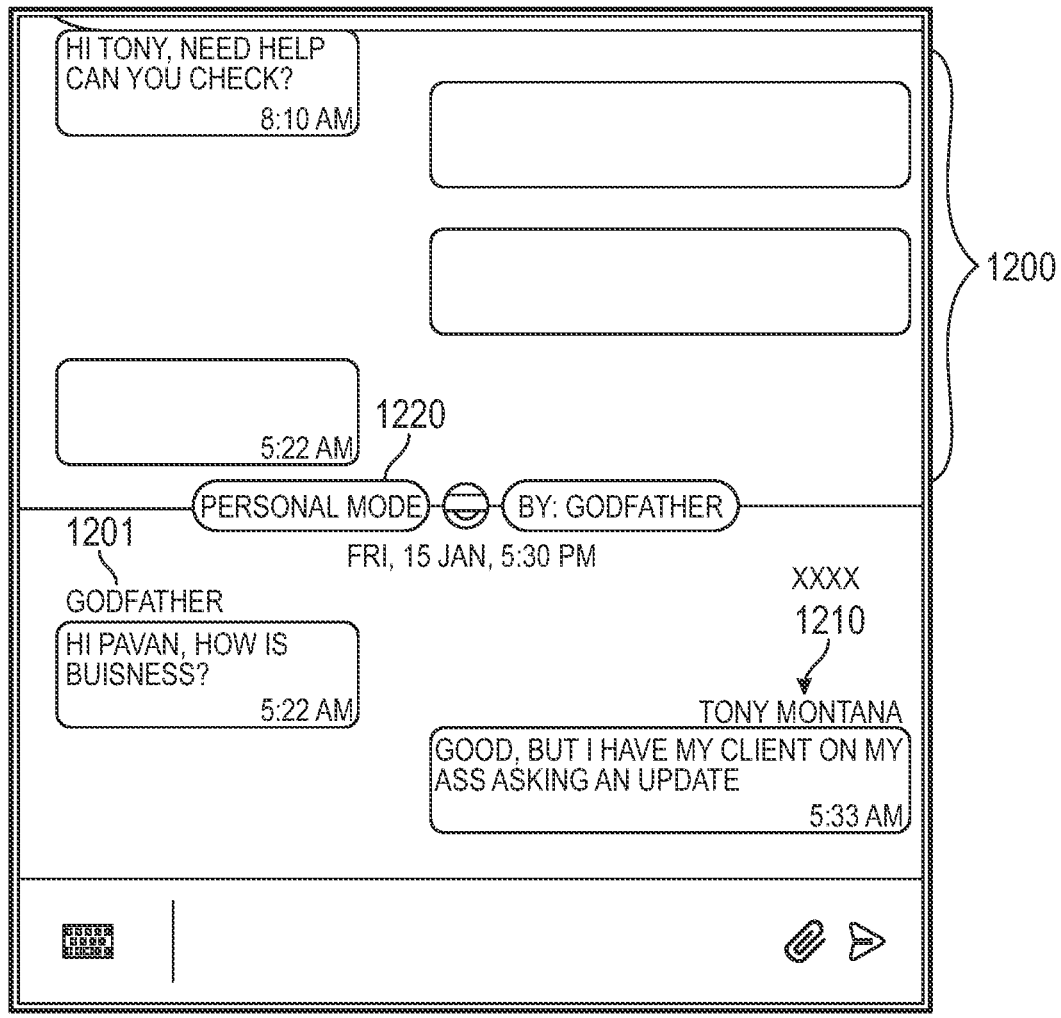

In some embodiments, as illustrated in FIG. 12C, a private conversation 1220 will appear as a section within the main conversation 1200. The user 1201 who invited user 1210 to the private conversation will be identified at the top. As the users 1201, 1210 are having their private conversation 1220, the main conversation 1200 will appear above allowing users 1201, 1210 to view it simultaneously, as they are chatting inside the private conversation 1220.

As alluded to above, by providing users with an ability to have private conversations without leaving the group conversation allows users to consolidate the number of conversations thereby reducing the processing necessary to support individual conversations, access right, UI management, and privacy rights; thereby providing convenience and time saving benefits (i.e., users will not be required to hop between private conversation and group conversation).

In some embodiments, the system may be configured to use chat interface of a client application 127 running on the client computing device 120, as illustrated in FIG. 1, to control and manage social media applications and related content. For example, the users may utilize AA to view particular posts. Currently, social media platforms provide users with ability to views posts of others within their "feed" (i.e., social media friends) in a chronological order. That is the posts that were posted most recently will be presented first. As new posts are made, the "feed" is updated thereby placing the newest post at the top of the feed and pushing earlier posts down. Because the refresh happens anytime a new post is made, the viewer looking a particular post is often faced with having to scroll down to locate the post they saw prior to refresh. This causes users to often "lose" important posts not to mention the time spent trying to locate it. Additionally, it is almost impossible to go back because the algorithm may prevent the user from seeing the post until much later when the post gains traction, for example. Content creators struggle with ensuring that their posts are viewed on the date of creation.

Figure 13:
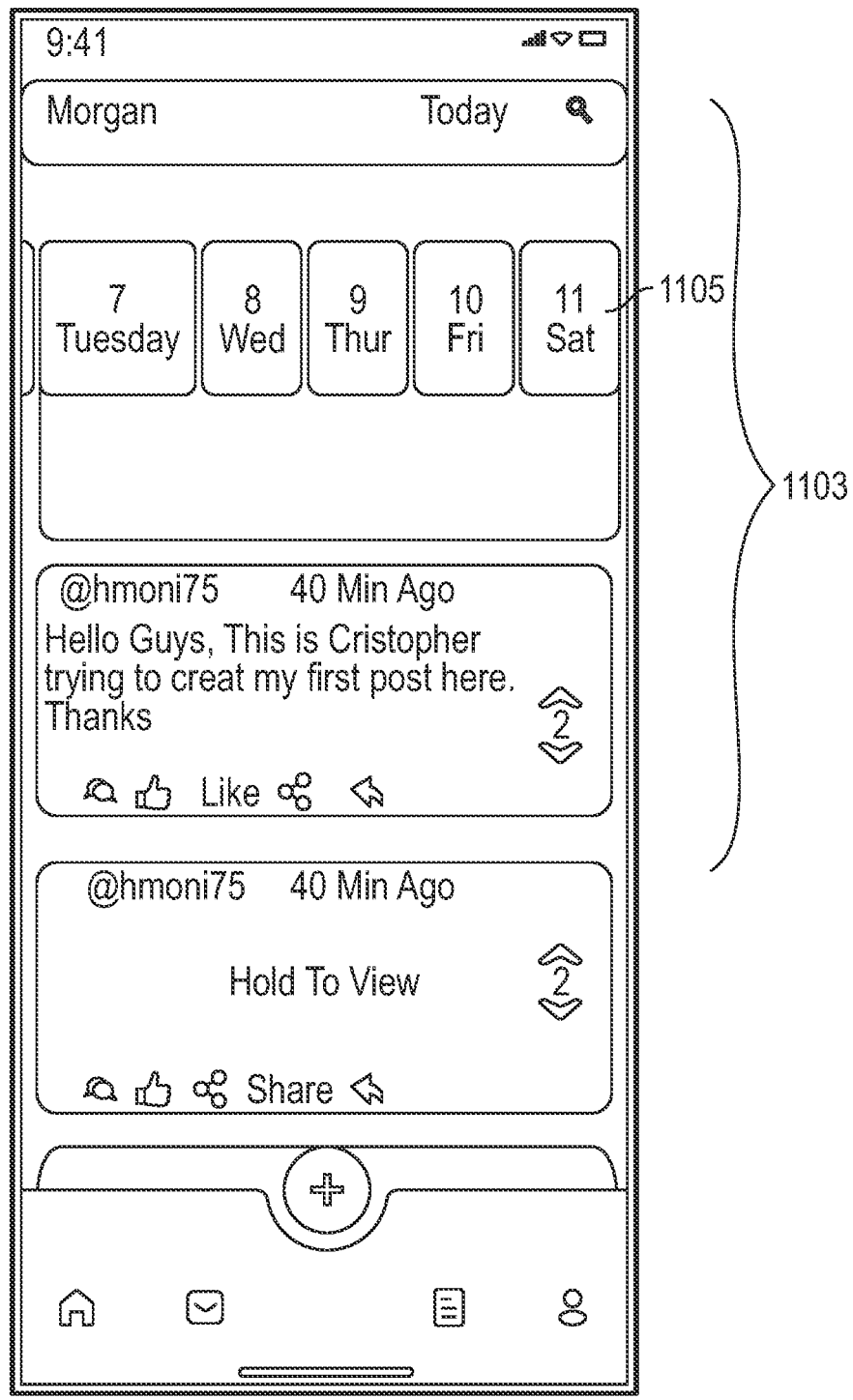
FIG. 13 illustrates an example interface for managing social media calendar, according to an implementation of the disclosure.

As illustrated in FIG. 13, utilizing application 127, allows the user to view all posts made on a particular day by initiating the calendar view of the social media (e.g., Facebook). The user will be pressed with a calendar view allowing users to select a particular day and to show what day they've selecting and then continuing to see those days' postings by scrolling down. For example, the user can swipe right or make a verbal command to start scrolling through the posts made on day 1305. The posts will appear in a chronological order for that day.

Additionally, if users wish to see a "mashup" of all the posts together before a particular date, the application 127 interface will allow users to select a mashup mode by selecting a symbol for infinite posts resulting in a view of all posts made on any day before the selected date.

In some embodiments, the system may be configured to use chat interface of a client application 127 running on the client computing device 120, as illustrated in FIG. 1, to control and manage GPS-based navigation. For example, the user may utilize AA (e.g., Morgan) operated by chat interface (i.e., via commands entered as text or voice) to request directions when navigating from home to school.

Currently, about 75% of all smartphone owners use a variety of mobile GPS navigation applications to help them move from one geographic location to another. For example, users frequently use a GPS navigation application when going to a place they haven't been or do not visit frequently (e.g., from an airport to a hotel or from work to a client's office). Additionally, many commuters driving to known locations user GPS navigation applications because of the additional data provided, such as accident alerts, traffic alerts, police presence alerts, used to adjust route selection and estimated time of arrival. Furthermore, GPS navigation is heavily used by food delivery and ride sharing app uses.

Figure 14A:
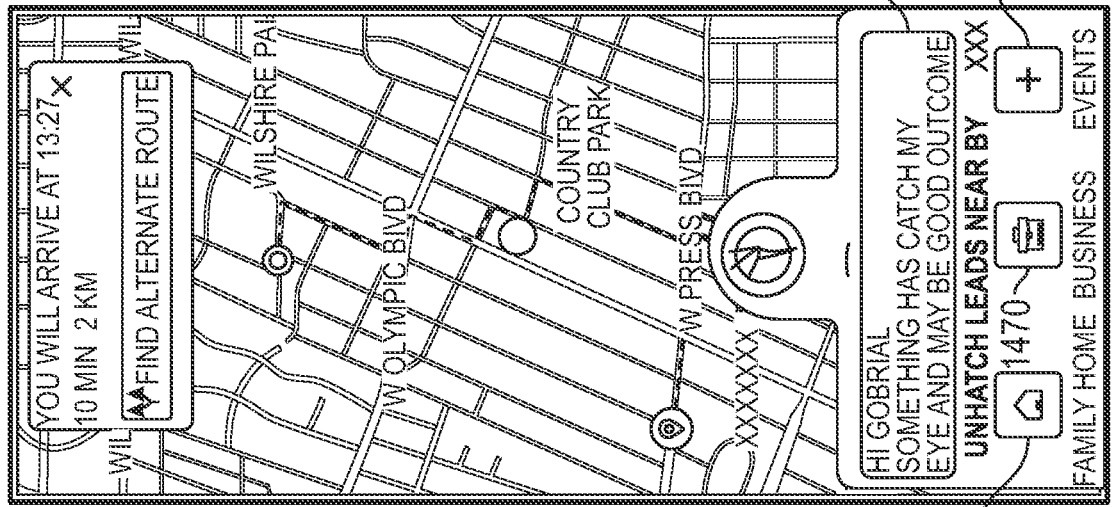
FIGS. 14A-14C illustrate example interfaces for managing GPS navigation, according to an implementation of the disclosure.

Accordingly, GPS navigation applications are relied on by users on a daily basis, thereby presenting opportunities to provide user-specific content in a GPS navigation context. For example, as illustrated in FIG. 14A, by utilizing the chat interface of a client application 127 running on the client computing device 120, as illustrated in FIG. 1, the user may operate the GPS navigation app. The user may provide AA Morgan the destination location 1420 and in response AA generate a navigation map based 1405 on the current location of the user 1410. In addition to providing directions from location 1410 to 1420, application 127 may display the estimated time of arrival 1430 and other similar information.

In some embodiments, client computing device 120, illustrated in FIG. 1, may be equipped with GPS location tracking and may transmit geolocation information via a wireless link and network 140. In some embodiments, computing component 102 and/or chat application 127 may use the geolocation information to determine a geographic location associated with the user. In some embodiments, computing component 102 may use signal transmitted by client computing device 120 to determine the geolocation of the user based on one or more of signal strength, GPS, cell tower triangulation, Wi-Fi location, or other input. In some embodiments, the geolocation associated with the user may be used by one or more computer program components associated with the chat application 127 during user interaction with chat application 127.

In some embodiments, AA Morgan may share information about user's navigation with other users. For example, illustrated in FIG. 14A, user's estimated time of arrival 1430 as they travel to destination 1420 may be shared with user's colleagues or clients or user's contacts stored in their mobile device. In some embodiments, other users may track that user's trajectory and contact law enforcement or emergency services, if necessary (e.g., in the event of an accident).

In some embodiments, the user may request AA to perform certain tasks or requests. These requests may include sending estimated time of arrival 1430 data to a contact stored in user's mobile device. For example, the user may ask AA to send instructions (e.g., entered as text or voice commands) asking to provide user's contact with their estimated time of arrival. In some embodiments, users may instruct AA Morgan to send messages and alerts (e.g., I'll be 10 minutes late because of traffic) to keep other users updated of their travel plans.

As the user is utilizing the map application 127 when traveling from location 1410 to location 1420, the AA Morgan may transmit messages 1440 to the user. Messages may include information which the AA determines may be relevant to the user based on the geographic location of the user. That is, the messages may change in accordance with the change of geographic position of the user.

Figure 14B:
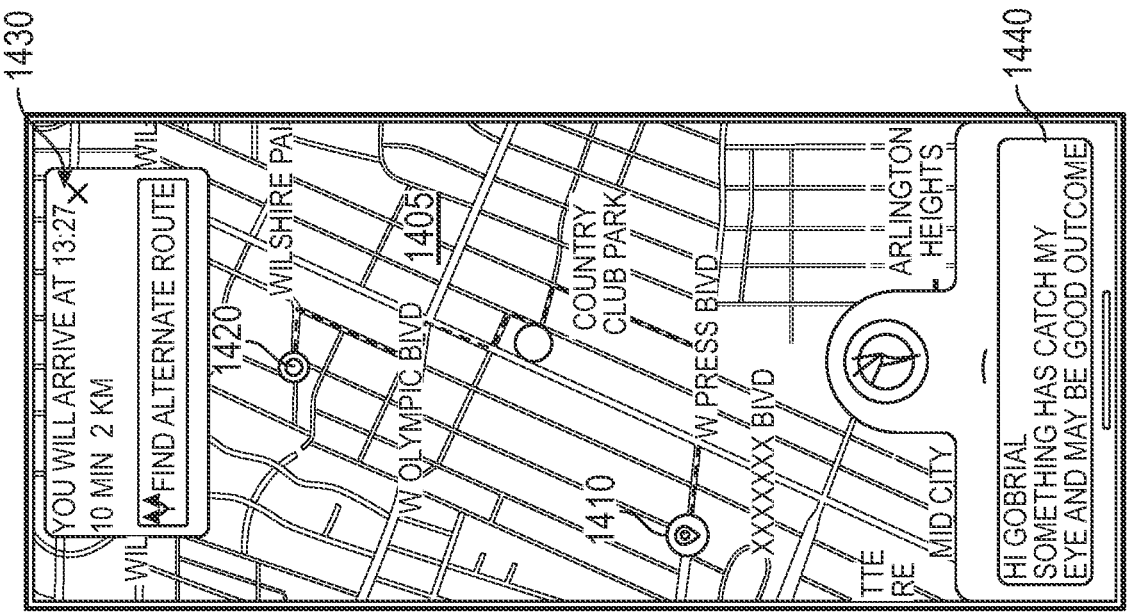

In some embodiments, these messages may include "Unhatched Leads", or real estate sales "leads". The leads may be grouped together based on one or more categories. For example, the leads may be grouped based on the type of lead (open house, new listing, and so on). Alternatively, the leads may be grouped based on the geographic proximity to user. For example, as illustrated in FIG. 14B, leads 1450 may be presented based on their geographic location (e.g., near user's home 1460 or near user's business 1470) or based on a category (e.g., leads that are associated with a particular event 1480).

In some embodiments, AA Morgan may determine user's location (e.g., based on one or more of signal strength, GPS, cell tower triangulation, Wi-Fi location, or other input, as alluded to above) and use the location information to determine the leads associated with a particular geographic location. The leads may be obtained using one more system or platform selected by AA Morgan as having relevant content. For example, these systems or platforms may include one or more social media platforms (Facebook, Twitter) or systems used by particular professionals. The AA Morgan may then determine that a particular event (e.g., a wine festival or a happy hour bar special) occurring at or near user's location is relevant to the user. In other embodiments, AA Morgan may determine that one or more specialized business and social events, such as real-estate events (e.g., open house) are occurring at or near user's location may be relevant to the user by using data from a real-estate application (e.g., mortgage database related to real-estate listings). In yet other embodiments, the AA may be customized for any type of activity or interest (e.g., non-profit events).

In some embodiments, AA Morgan may inform the user of relevant information by sending a message 1440, as illustrated in FIG. 14A. For example, AA Morgan may alert the user that it has found a possible relevant lead on a new project that could have a good outcome. By having access to the GPS coordinates of the user, the AA Morgan may provide user alerts as the user's location is within the proximity of a geographic location which the AA determines as relevant. In some embodiments, AA Morgan may provide users with a way to set an "alert radius", i.e., a geographic zone that corresponds to a particular geographic are with respect to user's current location.

Figure 14C:
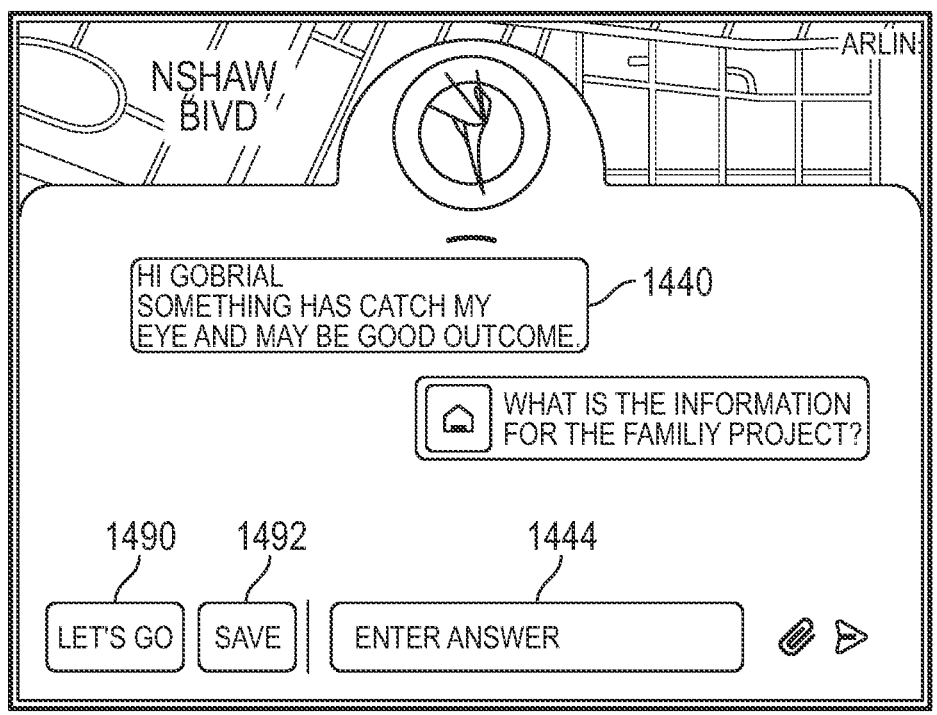

Upon viewing the message 1440 from AA Morgan, the user can view the details associated with the Unhatched Lead AA Morgan believes to be relevant. Furthermore, as illustrated in FIG. 14C, the user can read the message 1440 and decide if they want to navigate to the location of the Unhated Lead by clicking on the "Let's Go" button 1490 or by clicking on the "Save" button 1492, which allows the user to save the lead that can be viewed later. For example, the user may set a reminder to view the saved message 1440 informing of an Unhatched Lead after finishing their current task.

In other embodiments, the user may request more information about the Unhatched Lead included in message 1440 by selecting the message 1440 (e.g., as illustrated in FIG. 14A). Selecting the message 1440 will allow the user to request additional details related to the lead in message 1440. User request 1442 may include a message to AA Morgan asking to provide additional details of Family Home Project lead. The information may be entered as text via field 1444, as illustrated in FIG. 14C, or as voice commands (not illustrated). User's questions will automatically cause AA Morgan to generate a response, as described earlier.

Figure 15:
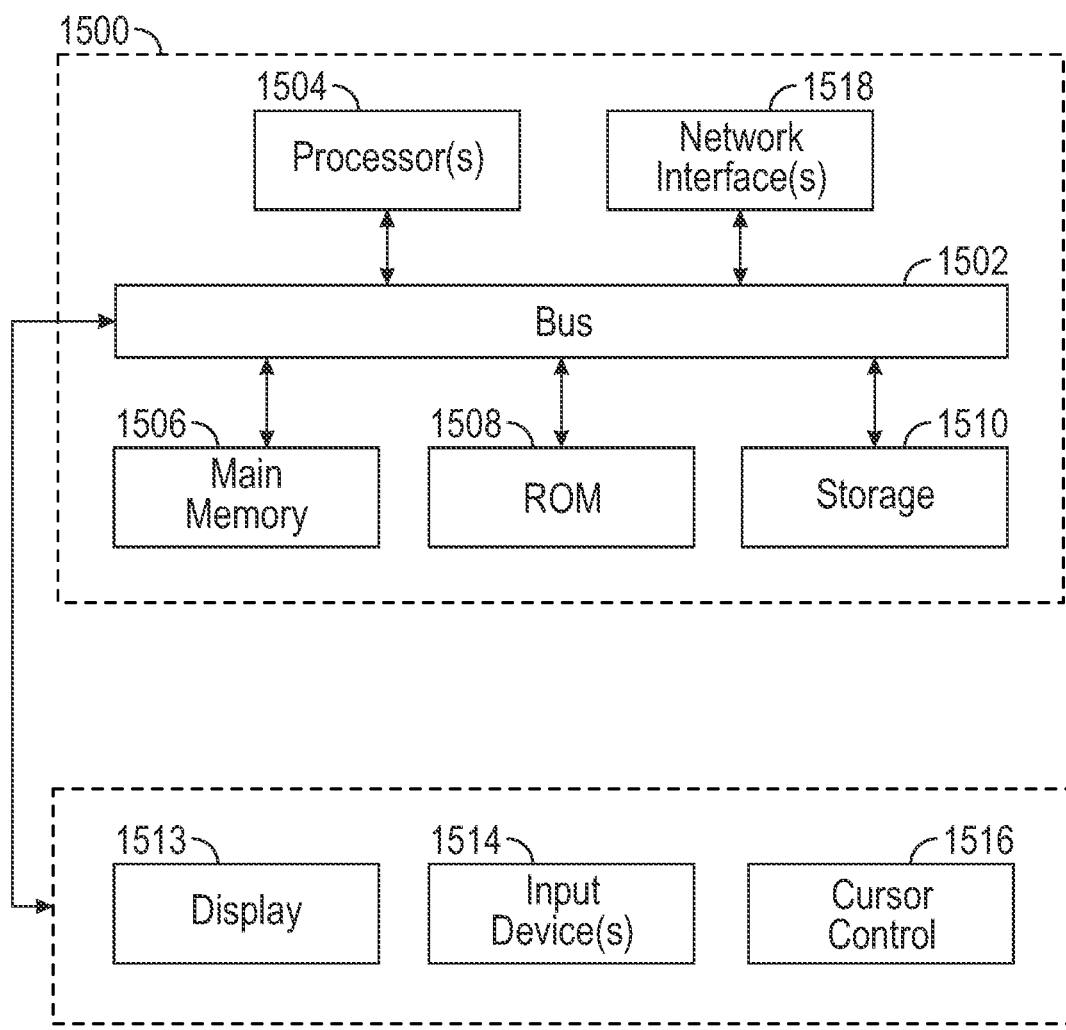
FIG. 15 illustrates an example computing system that may be used in implementing various features of embodiments of the disclosed technology.

As alluded to above, AA Morgan may share information about user's navigation with other users. For example, information related to user's decision to navigate to locations associated with Unhatched Leads, thereby changing the course and time of the original trip, may also be shared with other users.

Where components, logical circuits, or engines of the technology are implemented in whole or in part using software, in one embodiment, these software elements can be implemented to operate with a computing or logical circuit capable of carrying out the functionality described with respect thereto. One such example computing module is shown in FIG. 15. Various embodiments are described in terms of this example computing module 1500. After reading this description, it will become apparent to a person skilled in the relevant art how to implement the technology using other logical circuits or architectures.

FIG. 15 illustrates an example computing module 1500, an example of which may be a processor/controller resident on a mobile device, or a processor/controller used to operate a payment transaction device, that may be used to implement various features and/or functionality of the systems and methods disclosed in the present disclosure.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 15. Various embodiments are described in terms of this example-computing module 1500. After reading this description, it will become apparent to a person skilled in the relevant art how to implement the application using other computing modules or architectures.

Referring now to FIG. 15, computing module 1500 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 1500 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1500 might include, for example, one or more processors, controllers, control modules, or other processing devices, such as a processor 1504. Processor 1504 might be implemented using a general-purpose or special-purpose processing engine such as, for example, a microprocessor, controller, or other control logic. In the illustrated example, processor 1504 is connected to a bus 1502, although any communication medium can be used to facilitate interaction with other components of computing module 1500 or to communicate externally. The bus 1502 may also be connected to other components such as a display 1512, input devices 1515, or cursor control 1516 to help facilitate interaction and communications between the processor and/or other components of the computing module 1500.

Computing module 1500 might also include one or more memory modules, simply referred to herein as main memory 1506. For example, preferably random-access memory (RAM) or other dynamic memory might be used for storing information and instructions to be executed by processor 1504. Main memory 1506 might also be used for storing temporary variables or other intermediate information during execution of instructions to be executed by processor 1504. Computing module 1500 might likewise include a read only memory ("ROM") 1508 or other static storage device 1510 coupled to bus 1502 for storing static information and instructions for processor 1504.

Computing module 1500 might also include one or more various forms of information storage devices 1510, which might include, for example, a media drive and a storage unit interface. The media drive might include a drive or other mechanism to support fixed or removable storage media. For example, a hard disk drive, a floppy disk drive, a magnetic tape drive, an optical disk drive, a CD or DVD drive (R or RW), or other removable or fixed media drive might be provided. Accordingly, storage media might include, for example, a hard disk, a floppy disk, magnetic tape, cartridge, optical disk, a CD or DVD, or other fixed or removable medium that is read by, written to or accessed by media drive. As these examples illustrate, the storage media can include a computer usable storage medium having stored therein computer software or data.

In alternative embodiments, information storage devices 1510 might include other similar instrumentalities for allowing computer programs or other instructions or data to be loaded into computing module 1500. Such instrumentalities might include, for example, a fixed or removable storage unit and a storage unit interface. Examples of such storage units and storage unit interfaces can include a program cartridge and cartridge interface, a removable memory (for example, a flash memory or other removable memory module) and memory slot, a PCMCIA slot and card, and other fixed or removable storage units and interfaces that allow software and data to be transferred from the storage unit to computing module 1500.

Computing module 1500 might also include a communications interface or network interface(s) 1518. Communications or network interface(s) interface 1518 might be used to allow software and data to be transferred between computing module 1500 and external devices. Examples of communications interface or network interface(s) 1518 might include a modem or softmodem, a network interface (such as an Ethernet, network interface card, WiMedia, IEEE 802. XX or other interface), a communications port (such as for example, a USB port, IR port, RS232 port Bluetooth® interface, or other port), or other communications interface. Software and data transferred via communications or network interface(s) 1518 might typically be carried on signals, which can be electronic, electromagnetic (which includes optical) or other signals capable of being exchanged by a given communications interface. These signals might be provided to communications interface 1518 via a channel. This channel might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 1506, ROM 1508, and storage unit interface 1510. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1500 to perform features or functions of the present application as discussed herein.

Various embodiments have been described with reference to specific exemplary features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method comprising:
    initiating a conversation interface configured to receive a conversation between a plurality of human users and an automated software assistant ("AA") user, wherein the conversation comprises natural language input received from the plurality of human users when completing an electronic form, and natural language responses generated by the AA user when assisting the plurality of human users in completing the electronic form;
    receiving a first input from a first human user during the conversation with the AA user;
    determining the first human user requires assistance from a second human user;
    in response to detecting a topic transition in the conversation, automatically selecting a second human user with expertise in the detected topic using a machine learning model trained on historical expert engagements and conversation success metrics;
    transmitting a request for contact information of the second human user if the AA user does not already have the contact stored, and receiving a second input from the first human user comprising the contact information;
    transmitting an invitation to the second human user using the contact information of the second human user, wherein the invitation is configured to admit the second human user into the conversation between the first human user and the AA user; and
    receiving a first input from the second human user during the conversation among the first human user, the AA, and the second human user, wherein the first input from the second human user is responsive to the first input from the first human user; and
    recording instances where the second human user manually selects a different expert before the AA's detection and using this feedback to refine future expert selection via machine learning;
    wherein the invitation transmitted to the second human user comprises a link sent a mobile device operated by the second human user.

2. The computer-implemented method of claim 1, wherein determining the first human user requires assistance from the second human user comprises parsing a workflow for completing the electronic form.

3. The computer-implemented method of claim 2, wherein parsing the workflow for completing the electronic form comprises analyzing an electronic form document using keyword analysis and pattern matching.

4. The computer-implemented method of claim 2, wherein parsing the workflow for completing the electronic form comprises generating a set of questions the AA user asks each of the first human user and the second human user.

5. The computer-implemented method of claim 4, wherein the set of questions the AA user asks the input from the first human user comprises at least one of a homeowner status, an income, and a marital status.

6. The computer-implemented method of claim 2, wherein determining the first human user requires assistance from the second human user comprises detecting topic transitions within the conversation using a trained natural language processing model, and dynamically selecting a human expert based on a context-driven expertise matching algorithm.

7. The computer-implemented method of claim 6, wherein the machine learning system comprises at least one of a neural network, a rule-based system, a linear regression system, a non-linear regression system, a fuzzy logic system, a decision tree, a nearest neighbor classifier, and a statistical pattern recognition classifier.

8. The computer-implemented method of claim 7, wherein the neural network comprises a plurality of input nodes, a plurality of hidden nodes, and at least one output nodes, wherein the plurality of input nodes is connected to the plurality of hidden nodes, and the plurality of hidden nodes is connected to the at least one output node.

9. A system comprising:
    one or more computing processors; and
    a machine readable storage medium storing instructions that, when executed by the one or more processors, cause the system to:
        initiate a conversation interface configured to receive a conversation between a plurality of human users and an automated software assistant ("AA") user, wherein the conversation comprises:

natural language input received from a first human user when completing an electronic form, and natural language responses generated by the AA user when assisting the first human user users in completing the electronic form; and natural language responses from the second human user, after the second human user is invited into the conversation;

receive a first input from a first human user during the conversation with the AA user;

determine the first human user requires assistance from a second human user having expertise relevant to the first input;

in response to generating a first response from by the AA user comprising a request for contact information of the second human user, receive a second input from the first human user, wherein the second input comprises the contact information for the second human user;

apply expert selection criteria to determine an appropriate second human user, wherein the expert selection criteria include at least one of: user input complexity, historical resolution data, and subject matter relevance based on parsed workflow data;

transmit an invitation to the second human user using the contact information provided by the first human user, wherein the invitation is configured to admit the second human user into the conversation between the first human user and the AA user;

receive a first input from the second human user during the conversation among the first human user, the AA, and the second human user, wherein the first input from the second human user is responsive to the first input from the first human user; and record interactions between the AA user and the second human user to improve future expert selection, wherein the system:

identifies a change in assistance when an alternate HA provides input before the initially selected HA, and updates a machine learning model to refine future expert selection criteria based on such transitions;

wherein the invitation transmitted to the second human user comprises a link sent a mobile device operated by the second human user.

10. The system of claim 9, wherein determining the first human user requires assistance from the second human user comprises parsing a workflow for completing the electronic form.

11. The system of claim 10, wherein parsing the workflow for completing the electronic form comprises analyzing an electronic form document using keyword analysis and pattern matching.

12. The system of claim 10, wherein parsing the workflow for completing the electronic form comprises generating a set of questions the AA user asks each of the first human user and the second human user.

13. The system of claim 10, wherein the set of questions the AA user asks the input from the first human user comprises at least one of a homeowner status, an income, and a marital status.

14. The system of claim 10, wherein determining the first human user requires assistance from the second human user comprises detecting topic transitions within the conversation using a trained natural language processing model, and dynamically selecting a human expert based on a context-driven expertise matching algorithm.

15. The system of claim 14, wherein the machine learning system comprises at least one of a neural network, a rule-based system, a linear regression system, a non-linear regression system, a fuzzy logic system, a decision tree, a nearest neighbor classifier, and a statistical pattern recognition classifier.

16. The system of claim 15, wherein the neural network comprises a plurality of input nodes, a plurality of hidden nodes, and at least one output nodes, wherein the plurality of input nodes is connected to the plurality of hidden nodes, and the plurality of hidden nodes is connected to the at least one output node.

* * * * *